United States Patent [19]

Ueno et al.

[11] Patent Number: 5,034,432

[45] Date of Patent: Jul. 23, 1991

[54] POWDER COATINGS

[75] Inventors: Tasaburo Ueno; Akimitsu Uenaka; Yuji Toyoda; Katsuaki Kida; Masayuki Maruta, all of Osaka; Koichi Tsutsui, Kyoto, all of Japan

[73] Assignee: Nippon Paint Co., Ltd., Osaka, Japan

[21] Appl. No.: 458,542

[22] Filed: Dec. 29, 1989

[30] Foreign Application Priority Data

Dec. 29, 1988 [JP] Japan .................................. 63-333988
Dec. 29, 1988 [JP] Japan .................................. 63-333989
Dec. 29, 1988 [JP] Japan .................................. 63-333990
Mar. 23, 1989 [JP] Japan .................................. 1-73050

[51] Int. Cl.$^5$ ............................................. C08L 27/06
[52] U.S. Cl. .................................... 523/221; 523/206; 525/934; 428/407
[58] Field of Search ................ 523/221, 206; 525/934

[56] References Cited

FOREIGN PATENT DOCUMENTS 250183A 12/1987 European Pat. Off. .

Primary Examiner—Paul R. Michl
Assistant Examiner—John J. Guarriello
Attorney, Agent, or Firm—Wenderoth, Lind & Ponack

[57] ABSTRACT

The invention concerns powder coatings comprising thermoplastic or thermosetting type resin powder particles, each particle carrying at least on the surface thereof, a number of microparticles having an average diameter of 0.001 to 10$\mu$ of such resin as having a glass transition temperature of 50° to 150° C. and a SP value of 9 to 15, said microparticle optionally containing UV absorber or antioxidant or hardening catalyst, the weight ratio of said microparticles to the total weight of the powder coatings being 0.05 to 30% by weight. The present powder coatings are excellent in blocking resistance and capable of forming a coating with excellent stain resistance, coating appearance and other desired properties.

5 Claims, No Drawings

POWDER COATINGS

FIELD OF THE INVENTION

The present invention relates to thermoplastic or thermosetting type powder coatings being excellent in blocking resistance and capable of forming a coating with excellent stain resistance, coating appearance and other desired coating characteristics. The invention also concerns powder coatings being excellent in blocking resistance and capable of forming a coating with matte surface.

BACKGROUNDS OF THE INVENTION

In powder coatings area, there are always such demands that intended powder coatings should be excellent in blocking resistance and should give the least amount of fused or aggromerated mass or caking during storage thereof and that such powder coatings should be excellent, when applied by an electrostatic powder coating or a fluidized bed coating and baked, in flowability under molten state so that a smooth surface coating which is free from pinholes or creeping can be obtained therewith. However, since the abovementioned are each conflicting properties, none of the heretofore proposed powder coatings could satisfy the both requirements at the same time. That is, when a low molecular weight resin or a low Tg (glass transition temperature) resin is selectively used as a binder resin, flowability of the melted resin is indeed improved to some extent, but blocking resistance and sometimes film properties are liable to be lowered. Therefore, at the present days, it is inevitable that resin planning and paint planning are forced to make by making a compromise with only moderate improvements in blocking resistance, flowability and coating properties. As an approach for the solution of said problems, has been tried the addition of inorganic particles as colloidal silica, siloxane and the like into powder coatings. However, there is a limit in the amount of such particles to be added since an excessively larger amount of such particles will cause undersired loss in gloss or water resistance of the formed coating. Thus, the amount of such particles are only limited to at most about 0.2% by weight, which is totally useless for the intended improvement in blocking resistance of powder coatings.

The inventors have previously succeeded in establishing an effective means for improving both blocking resistance of powder coating and weather resistance, hardness and other desired properties of the formed coating wherein a comparatively larger quantity of crosslinked resin microparticles having an average diameter of 0.01 to 10μ are added to base powder coatings, and applied a patent on it ( Japanese Patent Publication (unexamined) Sho 62-292869). According to that invention, the resin microparticles used are crosslinked and hence, such microparticles themselves do not flow at the baking stage. Therefore, a further improved powder coating having excellent flowability and capable of resulting a far better coating with excellent appearance has been desired.

Furthermore, in a household electric appliance area as electric refrigerator, washing machine and the like, a stain resistance of the formed coating is a matter of great concern. Polyester-epoxy type powder coatings are believed to be the most suitable one in respects of corrosion resistance and mechanical properties of the resulted coating and however, even with this type of powder coatings, various problems are pointed in the household electric appliance area, due to its rather poor stain resistance and weather resistance properties. Household electric appliances ( e.g. microwave range, refrigerator and the like) are usually placed at the interior of a house and therefore, they are always exposed to various stains as smoking stain, magic ink stain, foodstuff stain, rouge stain and the like. Stain resistance of coating may be improved by increasing crosslink density of the coating by using a particular hardening system or a strong hardening catalyst or by increasig Tg value of used resin. However, these techniques will accompany the undesired increase in coating viscosity, resulting a marked loss in finishing appearance of the coating. Therefore, a fully satisfiable coating cannot be expected with these techniques from the standview of coating appearance and stain resistance.

In order to obtain an improved stain resistance as well as an improved weather resistance of coating, special powder coatings had been proposed in Japanese Patent Publication (unexamined) Sho 56-14567, wherein a particular hardening agent obtained by the reaction of p-oxybenzoic acid diglycidyl ester ether with a hydantoin compound was compounded with a polyester resin having a specific acid value and softening point. However, in that technique, the employable resins are of specific type and very expensive hardening agents are selectively used and therefore, the disclosed powder coatings can not be welcomed for generic uses. A more effective and less expensive powder coatings should be developed.

Among various properties of formed coating, weather resistance is another important matter of concern in an automobile industry and other technical fields. For this end, various ultraviolet ray absorbers (UV absorber) as benzophenones, benzotriazoles, benzoic acid phenyl and salicylic acid phenyl compounds or various antioxidants as phenols, phosphoric acid compounds, sulfur containing compounds and amines are often compounded in powder coating. However, these additives are comparatively expensive. Furthermore, since the additives must be uniformly compounded with the powder, comparatively larger quantites of such additives are required for the intended object. Therefore, a more effective and economical solution for the improvement in weather resistance is likewise be desired.

In a separate technical field of household electric appliances, there is an increasing demand for the obtainment of matte surface coating. At that time, the powder coatings used should be, of course, excellent in blocking resistance and the resulted coating should be excelelnt in film properties. To get a matte surface coating, various techniques have been proposed. That is, the first method is to add matting agent in powder coatings, the second one to add a combination of different type of matting agents and the third one is to add a hardening catalyst to powder coatings. Among them, in the first method, a larger quantity of matting agent is required for attaining a sufficient reduction in gloss of the formed coating, which in turn will cause the decrease in coating appearance and desired properties and especially water resistance. Therefore, the quantity of such matting agent is limited at most about 40% by weight of the total solid, which is rather deficient in having the intended matting effect. Furthermore, in this method, there is an additional problem such that the matting effect is inconsistent depending on the dispersion and kneading conditions. The same is true in the case of the respective second and third methods. There are also additional problems of poor compatibility and hard control of curing reaction in the latter two methods. Thus, fully satisfiable powder coatings have not been offered up to the present days for the matte surface coating.

It is, therefore, a principal object of the invention to provide powder coatings being excellent in blocking resistance and flowability at molten stage, capable of resulting a coating with excellent stain resistance, without the necessity of using any special additives or hardening agent, in an economical way. An additional object of the invention is to provide powder coatings being excellent in blocking resistance, capable of resulting a coating with far improved coating appearance, as well as stain resistance. A further object of the invention is to provide powder coatings which have the abovementioned characteristics and besides that, can result a coating with far improved weather resistance. A further object of the invention is to provide powder coatings being excellent in blocking resistance and capable of resulting a matte surface coating without losing the desired flowability, stain resistance and film properties. The other objects shall be clear from the statements of the specification and accompanying claims.

SUMMARY OF THE INVENTION

According to the invention, the abovementioned objects can be attained by providing (1) powder coatings comprising thermoplastic or thermosetting type resin powder particles, each particle carrying, at least on the surface thereof, a number of microparicles having an average diameter of 0.001 to $10\mu$ of such resin as having a glass transition temperature of 50 to 150° C. and a SP value of 9 to 15, the weight ratio of said microparticles to the total weight of the powder coating being 0.05:100 to 30:100;

(2) powder coatings as defined in (1), characterizing in that said microparticles are composed of uncrosslinked resin;

(3) powder coatings as defined in (1), characterizing in that said microparticles each contains UV absorber or antioxidant; and (4) powder coatings as defined in (1) with the proviso that the resin powder particles are of thermosetting type and which is further characterized in that the resin for said microparticle bears a hardening catalytic function through adsorption or absorption of a hardening catalyst to the resin or by integral incorporation of a catalystically functioning group in a constituting monomer of said resin.

PREFERRED EMBODIMENTS OF THE INVENTION

Thus, in the present invention, is provided powder coatings comprising comparatively large size, resin powder particles and comparatively small size, resin microparticles carried at least on the surface of each large size resin particle. The comparatively large size, resin powder particles may be of thermoplastic or thermosetting nature.

Any of the coating use resins may be advantageously used for said resin powder particles, providing that it is a solid at room temperature and has a film-forming property in its molten state.

Examples of thermoplastic resins are vinyl chloride resin and the like.

Thermosetting type resin powder particles are generally composed of a heat curing type binder resin and a hardening agent. Any of the binder resins and the hardening agents customarily used in heat-curing type powder coatings may be satisfactorily used in this invention. Examples of such resins are acrylic resin, polyester resin, epoxy resin and the like and examples of hardening agents are aminoplast resin, blocked insocyanate, epoxy resin, polyamide resin, isocyanurate compound, aliphatic dibasic acid and the like. These hardening agents are appropriately selected depending on the functionality of the binder resin used, as, for example, aminoplast, blocked isocyanate or isocyanurate for hydroxy bearing resin; epoxy resin for carboxyl bearing resin; polyamide resin or aliphatic dibasic acid for epoxy bearing resin.

The resin powder particles may be clear or pigmented and may further include other additives as desired. The particle size is usually in a range of 30 to 50 $\mu$ as in conventional powder coatings.

From the foregoing, it will be appreciated that in the present invention, very similar particles as used in the known powder coatings and in some instances heretofore proposed powder coatings themselves can be used as the large size resin particles. For distingushing purpose, such powder coatings used as the large size, resin powder particles may be referred to as "mother powder coatings" hereinunder. Thus, in the present invention, no particular binder resins, hardening agents, pigments or other additives are required for making the resin powder particles. Any of the conventional clear or pigmented, powder coatings may be satisfactorily used as resin powder particles.

However, in this invention, at least on the surface of said respective particle, particular resin microparticles must be carried in a specific weight ratio.

That is, the present microparticles must be composed of a resin having a glass transition temperature of 50° to 150° C., preferably 80° to 150° C. and a SP value of 9 to 15, preferably 10 to 13, and must have an average particle diameter of 0.001 to 10 $\mu$.

The inventors have first found that when resin microparticles having a comparatively high Tg value are present on the surface of such powder coating particle, blocking resistance and hence storage stability of the powder coatings are greatly improved. Further studies revealed that for the improvement of blocking resistance of powder coatings, said Tg should preferably be 50° C. or more and most preferably from the standview of improvement in stain resistance, 80° C. or more. However, from the other requirement of flowability, said Tg should be limited to at most 150° C. Next, the inventors have surprisingly found that for the improvement of stain resistance of the formed coating, solubility parameter (SP) of the resin for microparticles has an important role, and said resin must have a SP value of 9 to 15, besides the requirement of Tg value of 50 to 150° C. More preferably, SP value should be in a range of 10 to 13 and Tg value in a range of 80° to 120° C.

Incidentally, solubility parameter ($\delta$)SP) is a quantitative measure for polarity of a given polymer and may be determined by using the following equation $$\delta SP = (\sqrt{V_{ml}} \cdot \delta_{ml} + \sqrt{V_{mh}} \cdot \delta_{mh})(\sqrt{V_{ml}} + \sqrt{V_{mh}})$$

(wherein ml: low Sp solvent, mh: high Sp solvent, δ: solubility parameter, V: molecular volume at cloud point) (see K. W. SUH, J. M. CORBETT; Journal of Applied Polymner Science 12, 2359 (1968))

The exact reasons why the stain resistance is greatly improved by placing such resin microparticles at least on the surface of respective powder coating particle have not been made clear yet and however, at the present days, the inventors take the meanings as follows.

When powder coatings comprising comparatively large size resin powder particles, each particle having at least on the surface thereof a number of resin microparticles is heat-melted for baking, some of the microparticles are buried in the inside of said particle and the other are remained on the surface of powder coatings as they are, since the powder coatings containing no solvent is hardly transformed to a uniform system due to its higher viscosity. Therefore, the surface nature of thus formed coating is very similar to that of the microparticle resin, rather than the nature of said large size resin powder particles. This must be closely connected with the marked improvement in stain resistance of the resulted coating.

Tg value and SP value of a given resin may be easily controlled by those skilled in the art each in the defined range by the selection of species and amounts of the constituting components of the resin. This, however, can be most effectively and easily realized in the case of vinyl resin and therefore, vinyl copolymer microparticles are most preferably used in this invention.

The present resin microparticles may be either crosslinked or uncrosslinked and however, should have an average particle diameter of 0.001 to 10 $\mu$, preferably 0.01 to 5$\mu$. This particular diameter range had been determined by taking due consideration of preparation easiness and permiscible adding amount of these microparticles. That is, the preparation of microparticles having an average diameter of less than 0.001 is very difficult to do and hence the minimum size will be about 0.001 in practical sense.

Whereas, in obtaining the intended objects of this invention, there is a direct proportional relation-ship between the average size of the microparticles and the adding amounts thereof. If the average diameter exceeds over the upper limit of 10$\mu$, then such microparticles must be used in an amount of 20% by weight or more for obtaining the desired blocking resistance, which in turn causes adverse effects on coating appearance. In that sense, the average diameter of resin microparticles is desirably selected in a range of 0.001 to 10 and the amount of such microparticles in a range of 0.05 to 30% by weight, preferably 0.1 to 20% by weight of the total weight of the powder coatings.

Carrying of the resin microparticles on the surface of the respective resin powder particle may be done by various means. However, the most practical means comprises preparing the resin microparticles in a separate step and adding thus obtained microparticles to the mother powder coatings at any stage during the preparation of said powder coatings. More specifically, when the mother powder coatings are prepared by a dry method wherein a solid binder resin, hardener and other additives are mixed and milled in a kneader to give pellets, which are then pulverized and shieved, the abovementioned resin microparticles may be added to the coating powders at any stages of said mixing and milling, pulverizing and shieving steps. When the powder coatings are prepared by a wet process comprising dissolving or dispersing a solid binder resin, hardener and other additives in an appropriate solvent and spray drying the same, the abovementioned resin microparticles may be dispersed in said spray-drying solution or dispersion to obtain the present powder coatings. Mixing of resin powder particles and the resin microparticles may be carried out by using any conventional mixing devices as Super mixer, Henshel mixer, Hybritizer, ball mill and the like. However, the invention can never be limitted to the abovementioned preparation methods only. In certain cases, crosslinked resin microparticles having comparatively higher Tg value may be added directly to the melt of mother powder coatings in a comparatively larger quantity and the powder coatings may be formed therefrom. At that time, the resin microparticles may be located both on the surface and in the inside of thus formed powder coating, which is of course within the scope of this invention. The term "carrying" as used herein shall denote all of the abovementioned carrying embodiments. In the present powder coatings, the resin microparticles are thus located at least on the surface of the resin powder particles, and therefore, during the storage of said powder coatings, there is no fear of the powder particles being directly contacted with each other and there always exist high Tg resin microparticles therebetween. Therefore, undesired blocking is advantageously controlled and more over, desired sliding properties are given to the powder coatings, resulting an improved storage stability of the powder.

Differing from the case of inorganic microparticles, there is no undesirable loss in gloss and lowering in coating appearance. When the uncrosslinked resin microparticles are selected, the microparticles themselves can also be heat-melted to flow, giving a far better coating appearance. Therefore, in a more preferable embodiment, such uncrosslinked resin microparticles are selctively used. When crosslinked resin microparticles are used, coating hardness and weather resistance are improved, besides the improvements in stain resistance and blocking resistance. As already mentioned, in certain technical fields as in automobile industry and the like, there is a pressing need to improve weather resistance of coating to much higher level in an economical way.

The inventors have found that the abovementioned requirements can be ingeniously solved out by the powder coatings comprising thermoplastic or thermosetting type resin powder particles, each particle carrying at least on the surface a number of microparticles having an average diameter of 0.001 to 10 $\mu$ of such resin, preferably crosslinked resin, as having a glass transition temperature of 50° to 150° C. and a SP value of 9 to 15, and containing a UV absorber or an antioxidant in said microparticles, the weight ratio of said microparticles to the total weight of the powder coatings being 0.05:100 to 30:100.

As a UV absorber or an antioxidant, various products are commercially available and any of these known materials may be advantageously used in this invention.

Examples of such antioxidants are as follows:

(1) Phenolic antioxidants: as phenol, o-cresol, 2,6-xylene, 2,4,6-trimethyl phenol, guaiacol, β-naphthol, o-t-butyl phenol, 2,6-di-t-butyl phenol, 2,6-di-t-butyl-4-methyl phenol, 4,4'-thiobis(6-t-butyl-m-cresol), 2,5-di-t-amyl hydroquinone, 4,4'-butylidenebis-(6-t-butyl-m-cresol), 2,2'-methylenebis(4-methyl-6-t-butyl-3-methyl-cresol), 4,4'-butylidene bis(6-t-butyl-3methylphenol), 2,2'-thiobis(6-t-butyl-4-methylphenol),4,4-methylene bis(6-t-butyl phenol), 4,4'-bis(2,6-di-t-butylphenol), 4,4'-methylenebis(6-t-butyl-o-cresol), 4,4-thiobis(6-t-butyl-o-cresol), 1,1,3-tris(5-t-butyl-4-hydroxy-2-methylphenyl)butane, 2,4,6-tris(3,5-di-t-butyl-4-hydroxybenzyl)isocyanurate, 1,3-bis(3,5-di-t-butyl-4-hydroxyphenyl)- 2,2'-bis(2-dodecylthioethoxycarbonyl)propane, 1,6-bis(3,5-di-t-butyl-4-hydroxyacetoxy)hexane, 6-(4-hydroxy-3,5-di-t-butylanilino)-2,4-bis(n-octylthio)-1,3,5-triazine,tetrakis(β-(3,5-di-t-butyl-4hydroxyphenyl)propionyloxy methyl)methane, n-octadecyl-4-hydroxy-3,5-di-t-butyl phenyl)propionate, di-octadecyl-4-hydroxy-3,5-di-t-butyl benzyl phosphonate, diethyl-4-hydroxy-3,5 di-t-butyl benzyl phosphonate and the like;

(2) phosphoric antioxidants: as triphenyl phosphine, triphenyl phosphite, trisnonyl phenyl phosphite, trilauryl trithio phosphite, trimethyl phosphate, hexamethyl phosphoramide, di-phenyl decyl phosphite, di-cresyl phosphite and the like;

(3) sulfur containing antioxidants: as 2-mercaptobenzimidazole, thiodipropionic dilauryl, thiodipropionic di-stearyl, tetramethyl thiuram monosulfide, zinc dibutyl dithiocarbamate and the like;

(4) amine antioxidants: as aldol-α-naphthylamine, N-phenyl-β-naphthylamine, N,N'-diphenyl-p-phenylenediamine, N,N'-di-β-naphthyl-p-phenylene diamine, N-phenyl-N'-isopropyl-p-phenylene diamine, 1-(2-hydroxyethyl)-2,2,4-trimethyl decahydroquinoline,1-(2-hydroxyethyl)-2,2,4,8-tetramethyl decahydroquinoline, 3,3-dimethyl-trans-decahydroquinoxaline-2-one, bis(2,2,6,6-tetramethyl-4-piperidinyl)-sebacate, bis(2,2,6,6-tetramethyl-4-N-oxidopiperidinyl)-sebacate and the like, (5) Other antioxidants: as (2,2'-thiobis(4-t-octyl phenolate))-n-butylamine Ni, dicyclohexyl dithiophosphinic acid Co and the like.

Examples of ultra-violet absorbers are as follows:

(1) Benzophenones: as 2-hydroxy-4-methoxy benzophenone, 2-hydroxy-4-methoxy-4'-chlorobenzophenone, 2-hydroxy-4 methoxy-5-sulfobenzophenone, 2-hydroxy-4-benzyloxy benzophenone, 2-hydroxy-4-n-octoxy benzophenone, 2-hydroxy-4-dodecyloxy benzophenone, 2-hydroxy-4-stearyloxy benzophenone, 2,4-dihydroxy benzophenone, 2-hydroxy-4-methoxy-2'-carboxybenzophenone, 2,2',4,4'-tetrahydroxy-benzophenone, 2,2'-dihydroxy-4-methoxy benzophenone,2,2'-dihydroxy 4-n-octoxybenzophenone, 2,2'-hydroxy-4,4'-dimethoxy benzophenone, 2-hydroxy-5-chloro-benzophenone, 2,4-dibenzoyl resorcine and the like, (2) Benzotriazoles: as 2-(2'-hydroxy-5'-methylphenyl) benzotriazole, 2-(2'-hydroxy-3',5'-di-t-butylphenyl)-6-chlorobenzotriazole, 2-(2'-hydroxyhydroxy-5'-t-butylphenyl) benzotriazole, 2-(2'-hydroxy-3'-t-butyl-5'-methylphenyl)benzotriazole, 2-(2'-hydroxy-3',5'-di-t-butylphenyl) 5-chlorobenzotriazole, 2-(2'-hydroxy diisoamylphenyl)benzotriazole, 2-(2'-hydroxy-4-octoxyphenyl)benzotriazole and the like, (3) Phenyl benzoates: as resorcinol monobenzoate and the like, (4) Phenyl salicylates: as phenyl salicylate, 4-t-butylphenyl salicylate, p-octylphenyl salicylate and the like, (5) Other UV absorbers: as (2,2'-thiobis(4-t-octylphenolate))-n-butylamine Ni (II), 3,5-di-t-butyl-4-hydroxybenzyl phosphonic acid ethyl ester Ni(II), 2',4'-di-t-butylphenyl-3,5 di-t-butyl-4-hydroxy benzoate, α-cyano-β-methyl-β-(p-methoxyphenyl) acrylic acid methyl, diphenyl methylene cyano acetic acid ethyl, diphenyl methylene cyano acetic acid 2-ethylhexyl and the like, (6) Polymerizable UV absorbers: as 2-hydroxy-4-(3-methacryloxy-2-hydroxypropoxy)benzophenone, 2,2'-dihydroxy-4-(3-methacryloxy propoxy)benzophenone, 2,6-di-t-butyl-4-vinyl phenol, 2-hydroxy-4-(vinyl benzyloxy) benzophenone and the like.

It is also possible to use any resin constituting components, e.g. monomers, to which the abovementioned antioxidants or UV absorbers are incorporated.

As to the preparation of resin microparticles containing such material (hereifafter called as functional material), various methods may be used. That is, the first method is to force the previously made resin microparticles to absorb or adsorb the functional material mechanically. This type of carrying may be attained by first providing a solution of functional material in an appropriate organic solvent which is a solvent for the functional material but not for the resin microparticles and dipping the resin microparticles in thus obtained solution or adding a solution of said functional material to a dispersion liquid of said resin microparticles and then isolating the microparticles therefrom.

The second method is to add the functional material into the monomer mixture to be polymerized to the resin microparticles. This method is pecifically useful for the functional material which is soluble in that monomer mixture, but is hardly soluble in a polymerization medium employed. The third method is a technique which is usually applied to an acrylic resin, wherein a polymerizable ethylenic unsaturation bond is first introduced through a covalent bond into the functional material and thus obtained polymerizable functional material is copolymerized with other monomers for the resin microparticles. This method is generally applied to the preparation of UV absorber bearing acrylic resin microparticles. At that time, polymerizable functional material is usually obtained by reacting a polymerizable ethylenically unsaturated carboxylic acid or alcohol with a functional material having a hydroxyl or amino group and coupling the abovementioned two materials through an ester bond, ether bond, amide bond or the like. In the case of antioxidant, since there are many instances that the desired antioxidant effect is completely lost out through blocking of such functional group, the abovementioned technique cannot be generally utilized. However, when plural functional groups are contained in the intended antioxidant and its activity is not so adversely affected by the blocking of part of said functional groups, then the technique may be adopted in such an instance. The amount of functional material to be carried by the resin microparticles may vary in comparatively large range with the type of such material, type of carrying resin, intended object or the like, but it is generally in a range of 1 to 30% by weight of the total weight of the resin microparticles.

When this type of resin microparticles are carried on the surface of resin powder particles and thus obtained powder coating a are applied on a substrate in a usual way, a particularly desirable coating can be obtained in respect of weather resistance. This is because, such functional material as UV absorber or antioxidant is contained in the resin microparticles and not in the mother powder coatings as in a conventional powder, and therefore, when formed coating, said functional material may be localized at the surface area of the formed coating and very similar effect can be obtained just like the case wherein a coating is covered with a separate coating of such functional material. Furthermore, since the functional material is contained in the resin microparticles and preferably on the surface of said respective microparticle, the required amount of such material for intended object may be cut sharply as compared with the case wherein the same material is contained in the powder coatings.

In another aspect of the invention, is provided powder coatings comprising thermosetting type resin powder particles, each particle carrying at least on the surface thereof, a number of resin microparticles having an average diameter of 0.001 to 1,$\mu$ and having a glass transition temperature of 50 to 150° C. and a SP value of 9 to 15 and each resin microparticle bearing at least on the surface thereof a hardening catalyst function. The term "hardening catalyst function" as used herein shall denote both hardening catalyst itself and catalytically functionig group and the term "bearing" shall mean both mechanical adsorption or absorption and integral incorporation of such function in the resin as a constituting element thereof.

In the case of hardening catalyst, this may be added to resin microparticles at any stages of the preparation of such microparticles or granulation stage, or the hardening catalyst may be first dissolved in an appropriate solvent and thus obtained solution is adsorbed or absorbed in the resin microparticles. Any of the hardening catalysts customarily used in thermosetting type powder coatings may be satisfactorily used. Particularly preferable catalysts are, however, hardening catalysts for thermosetting type vinyl resins. Examples are imidazoles as 2-methyl imidazole, 2-phenyl imidazole, 2,4-dimethyl imidazole and the like; amines as triethylamine, diethylaminopropyl amine, benzyl methyl amine, N-aminoethyl piperazine and the like; complex of $BF_3$ and triethylamine and the like. Additional examples are organo tin compounds as tetrabutyl tin, dibutyl tin dilauryl mercaptide, butyl tin tris-dodecyl mercaptide, dimethyl tin sulfide, monooctyl tin sulfide, tributyl tin laurate, tributyl tin oleate, dibutyl tin dilaurate, dibutyl tin distearate, dibutyl tin laurate maleate, dioctyl tin lurate maleate, tributyl tin acetate, trimethyl tin maleate, tributyl tin maleate, tributyl tin gluconate, dibutyl tin oxide, tetraphenyl tin, tributyl tin butyl phenolate, tributyl tin tetraphthalate, tributyl tin cinnamate and the like; and organo tin stabilizers as alkyl tin compounds, alkyl tin mercaptides, alkyl tin sulfides, alkyl tin unsubstituted monocarboxylates, alkyl tin maleates alkyl tin fumarates, alkyl tin substituted carboxylates, alkyl stannates, alkyl tin chlorides, bis(alkyl tin) oxides, alkyl hydroxy tin compounds, alkyl alkoxy tin compounds, aryl tin compounds, phenolate tin compounds, tin aliphatic carboxylates and the like.

Alternatively, a polymerizable monomer bearing catalytically functioning group in its molecule may be polymerized with other copolymerizable monomers, thereby making the resin microparticles bear at least on the surface of the respective microparticle the catalytically functioning group as carboxyl, sulfonyl, sulfonic acid group and the like. Carboxyl is an effective catalytically functioning group for the reaction between hydroxyl and isocyanate groups. Examples of catalytically functioning groups for the reaction between hydroxyl and isocyanate groups are carboxyl, trialkyl tin, organo copper, dialkylamino groups and the like and typical examples of addition polymerizable ethylenicl compounds having such groups are acrylic acid, methacrylic acid, itaconic acid, maleic acid, fumaric acid, trialkyl tin acrylate, trialkyl tin methacrylate, organo copper containing acrylate, organo copper containing methacrylate, dimethylaminoethyl acrylate, dimethylaminoethyl methacrylate and the like. In addition thereto, such basic monomers may be advantageously used, as dimethylamino acrylate, dimethylamino methacrylate, diethylaminoethyl acrylate, diethylaminoethyl methacrylate, butylaminoethyl methacrylate, butylaminoethyl acrylate, 2-vinyl pyridine, 4-vinyl pyridine, 2-methyl-5-vinyl pyridine, 2-ethyl-5-vinyl pyridine, dimethyl allyl amine, diallyl amine, vinyl pyrroline, vinyl isoquinoline, N,N-dimethylaminoethyl vinyl ether, 2-(N,N-dimethylamino) 4 vinyl pyrimidine, trans 1,2dipyridyl ethylene, 3-cinnamoyl pyridine, 2-methyl-5-cinnamoyl pyridine, 4,6-diamino-2-vinyl-5-triazine and the like. The amount of hardening catalyst- or catalytically functioning group-bearing resin microparticles should preferably be determined so as to be 0.05 to 30%, preferably 0.1 to 10% and most preferably 0.1 to 5%, by weight of the total powder coatings. If the amount of said microparticles exceeds over the upper limit of 30% by weight, the intended matte surface can never be obtained.

By the adoption of such microparticles, particularly useful powder coatings being excellent in blocking resistance and capable of resulting a coating with excellent stain resistance, smoothness and other desired properties, as well as an excellent matting effect may be obtained. This matting effect is believed to be derived from the fact that at the baking and curing stage of the applied coating, since the abovementioned catalyst or catalytically functioning group is localized in a higher concentration at the surface area of said coating, curing reaction is occured in much higher speed at the surface area than in the inside of said coating, resulting an effective matting effect.

Since the composition of such powder coatings is very similar to those of the powder coatings containing no catalyst or catalytically functioning group, other advantageous effects than matting effect obtainable with the present powder coatings are likewise obtained in this aspect of the invention.

The invention shall be now more fully explained in the following examples. Unless otherwise being stated, all parts and % are by weight.

REFERENCE EXAMPLE 1

PREPARATION OF UNCROSSLINKED RESIN MICROPARTICLES (a-1)

Into a reaction flask fitted with a stirrer, a condenser and a thermoregulator, were placed 380 parts of deionized water and 2 parts of nonionic surfactant MON2 (trademark, Sanyo Kasei K.K.) and the mixture was heated under stirring at 80° C. to get a clear solution. To this, a solution of 1 part of ammonium persulfate (initiator) in 10 parts of deionized water was added and then a mixture of 61 parts of methyl methacrylate, 36 parts of styrene and 3 parts of n-butyl methacrylate was dropwise added in 60 minutes. After completion of said addition, the combined was stirred at 80° C. for 60 minutes to obtain an emulsion having a nonvolatile content of 20%, average diameter of the emulsion being 0.03 to 0.05$\mu$. This emulsion was then subjected to a spray drying to obtain resin microparticles (a-1) having an average particle diameter of 0.03 to 0.05, SP 10 and Tg 110° C.

REFERENCE EXAMPLE 2

PREPARATION OF UNCROSSLINKED RESIN MICROPARTICLES (a-2)

Into a reaction flask fitted with a stirrer, a condenser and a thermoregulator, were placed 380 parts of deionized water and 2 parts of nonionic surfactant MON2 (trademark, Sanyo Kasei K.K.) and the mixture was heated under stirring at 80° C. to get a clear solution. To this, a solution of 1 part of ammonium persulfate (initiator) in 10 parts of deionized water was added and then a mixture of 90 parts of methyl methacrylate, 33 parts of styrene, 4.6 parts of n-butyl methacrylate and 20 parts of 2-hydroxyethyl methacrylate was dropwise added in 60 minutes. After completion of said addition, the combined was stirred at 80° C. for 60 minutes to obtain an emulsion having a nonvolatile content of 20%, average diameter of the emulsion being 0.03 to 0.05$\mu$. This emulsion was then subjected to a spray-drying to obtain resin microparticles (a-2) having an average particle diameter of 0.03 to 0.05, SP 10 and Tg 50° C.

REFERENCE EXAMPLE 3

PREPARATION OF UNCROSSLINKED RESIN MICROPARTICLES (a-3)

Into a reaction flask fitted with a stirrer, a condenser and a thermoregulator, were placed 380 parts of deionized water and 2 parts of nonionic surfactant MON2 (trademark, Sanyo Kasei K.K.) and the mixture was heated under stirring at 80° C. to get a clear solution. To this, a solution of 1 part of ammonium persulfate (initiator) in 10 parts of deionized water was added and then a mixture of 3 parts of lauryl methacrylate and 97 parts of styrene was dropwise added in 60 minutes. After completion of said addition, the combined was stirred at 80° C. for 60 minutes to obtain an emulsion having a non-volatile content of 20%, average diameter of the emulsion being 0.03 to 0.05,$\mu$. This emulsion was then subjected to a spray-drying to obtain resin microparticles (a-3) having SP 8.5 and Tg 90° C.

REFERENCE EXAMPLE 4

PREPARATION OF UNCROSSLINKED RESIN MICROPARTICLES (a-4)

Into a reaction flask fitted with a stirrer, a condenser and a thermoregulator, were placed 380 parts of deionized water and 2 parts of nonionic surfactant MON2 (trademark, Sanyo Kasei K.K.) and the mixture was heated under stirring at 80° C. to get a clear solution. To this, a solution of 1 part of ammonium persulfate (initiator) in 10 parts of deionized water was added and then a mixture of 31 parts of methyl methacrylate, 23 parts of 2-hydroxyethyl methacrylate and 46 parts of styrene was dropwise added in 60 minutes. After completion of said addition, the combined was stirred at 80° C. for 60 minutes to obtain an emulsion having a non-volatile content of 20%, average diameter of the emulsion being 0.03 to 0.05$\mu$. This emulsion was then subjected to a spray-drying to obtain resin microparticles (a-4) having SP 10.5 and Tg 100° C.

REFERENCE EXAMPLE 5

PREPARATION OF UNCROSSLINKED RESIN MICROPARTIUCLES (a-5) BY PULVERIZATION METHOD

The acrylic resin (a-9) hereinafter mentioned in Reference Example 9 having Tg value of 90° C. was pulverized by means of grinder to obtain uncrosslinked resin microparticles (a-5) having an average diameter of 0.5$\mu$.

REFERENCE EXAMPLE 6

PREPARATION OF UNCROSSLINKED RESIN MICROPARTIUCLES (a-6) BY PULVERIZATION METHOD

The acrylic resin (a-9) hereinafter mentioned in Reference Example 9 having Tg value of 90° C. was pulverized by means of grinder to obtain uncrosslinked resin microparticles (a-6) having an average diameter of 15$\mu$.

REFERENCE EXAMPLE 7

PREPARATION OF CROSSLINKED RESIN MICROPARTICLES (a-7)

Into a reaction flask fitted with a stirrer, a condenser and a thermoregulator, were placed 282 parts of deionized water, 2 parts of nonionic surfactant MON2 (trademark, Sanyo Kasei K.K.) and dimethylethanolamine and the mixture was heated under stirring at 80° C. to get a clear solution. To this, a solution of 4.5 parts of azo-biscyano valeric acid in 45 parts of deionized water and dimethylethanolamine was added and then a mixture of 70.7 parts of styrene, 94.2 parts of n-butylacrylate, 70.7 parts of methyl methacrylate, 30 parts of 2-hydroxyethyl acrylate and 4.5 parts of ethyleneglycol dimethyl methacrylate was dropwise added in 60 minutes. Thereafter, a solution of 1.5 parts of azo-biscyano valeric acid in 15 parts of deionized water and 1.4 parts of dimethylethanolamine was added. After completion of said addition, the combined was stirred at 80° C. for 60 minutes to obtain an emulsion having a nonvolatile content of 45%, average diameter of the emulsion being 0.16$\mu$. This emulsion was then subjected to a spray-drying to obtain resin microparticles (a-7) having SP 10.2 and Tg 85° C.

REFERENCE EXAMPLE 8

PREPARATION OF CROSSLINKED RESIN MICROPARTICLES (a-8)

Into a reaction flask fitted with a stirrer, a condenser and a thermoregulator, were placed 282 parts of deionized water, 2 parts of nonionic surfactant MON2 (trademark, Sanyo Kasei K.K.) and dimethylethanolamine and the mixture was heated under stirring at 80° C. to get a clear solution. To this, a solution of 4.5 parts of azo-biscyano valeric acid in 45 parts of deionized water and 4.3 parts of dimethylethanol amine was added and then a mixture of 70.7 parts of styrene, 94.2 parts of n-butyl acrylate, 70.7 parts of methyl methacrylate, 30 parts of 2-hydroxyethyl acrylate and 4.5 parts of ethyleneglycol dimethacrylate was dropwise added in 60 minutes. Thereafter, a solution of 1.5 parts of azo-biscyano valeric acid in 15 parts of deionized water and 1.4 parts of dimethylethanolamine was added. After completion of said addition, the combined was stirred at 80° C. for 60 minutes to obtain an emulsion having a nonvolatile content of 45%, average diameter of the emulsion paarticle being 0.15 to 0.3$\mu$. This emulsion was then subjected to a spray-drying to obtain resin microparticles (a-8) having SP 10.2 and Tg 85° C.

REFERENCE EXAMPLE 9

PREPARATION OF TG 100° ACRYLIC RESIN (a-9)

Into a reaction flask fitted with a dropping funnel, a stirrer and a thermometer, were placed 80 parts of xylene and heated to 130° C. To this, a solution of 36 parts of methyl methacrylate, 10 parts of styrene, 24 parts of glycidyl methacrylate, 5 parts of t-butyl methacrylate and 6 parts of Kayaester 0 (initiator) was dropwise added from a dropping funnel in 3 hours. After completion of said addition, the content was maintained at the same temperature for 30 minutes and then a mixture of 20 parts of xylene and 1 part of Kayaester 0 was dropwise added in 1 hour. Thereafter, the combined was maintained at 130° C. for 2 hours and xylene was distilled off in vaccuo to obtain an acrylic resin (a-9) having SP 11 and Tg 100° C.

REFERENCE EXAMPLE 10

PREPARATION OF TG 70° ACRYLIC RESIN (a-10)

Into a reaction flask fitted with a dropping funnel, a stirrer and a thermometer, were placed 80 parts of xylene and heated to 130° C. To this, a solution of 55 parts of methyl methacrylate, 10 parts of styrene, 30 parts of glycidyl methacrylate, 5 parts of n-butyl methacrylate and 6 parts of Kayaester 0 (initiator) was dropwise added from a dropping funnel in 3 hours. After completion of said addition, the content was maintained at the same temperature for 30 minutes and then a mixture of 20 parts of xylene and 1 part of Kayaester 0 was dropwise added in 1 hour. Thereafter, the combined was maintained at 130° C. for 2 hours and xylene was distilled off in vaccuo to obtain an acrylic resin (a-10) having Tg=70° C.

REFERENCE EXAMPLE 11

PREPARATION OF TG 40 ACRYLIC RESIN (a-11)

Into a reaction flask fitted with a dropping funnel, a stirrer and a thermometer, were placed 80 parts of xylene and heated to 130° C. To this, a solution of 19 parts of methyl methacrylate, 10 parts of styrene, 30 parts of glycidyl methacrylate, 41 parts of n-butyl methacrylate and 6 parts of Kayaester O (initiator) was dropwise added from a dropping funnel in 3 hours. After completion of said addition, the content was maintained at the same temperature for 30 minutes and then a mixture of 20 parts of xylene and 1 part of Kayaester 0 was dropwise added in 1 hour. Thereafter, the combined was maintained at 130° C. for 2 hours and xylene was distilled off in vaccuo to obtain an acrylic resin (a-11) having Tg=40.

REFERENCE EXAMPLE 12

PREPARATION OF POLYESTER POWDER COATINGS (a-12)

100 parts of ER 6800 (polyester resin, trademark, Nihon Polyester Co.), 36 parts of Krelan UI (trademark, blocked isocyanate, manufactured by BASF) and 40 parts of titanium oxide were dry-mixed in a Henshel mixer (trademark, Mitui-miike Seisakusho). Next, the mixture was melt-kneaded in Co-keader PR-46 (manufactured by Bus in Swizerland) at 100° C. and then allowed to cool. The solid mass was pulverized in a hammer mill and shieved with a 150 mesh wire screen to obtain powder coatings (a-12).

REFERENCE EXAMPLE 13

PREPARATION OF ACRYLIC RESIN POWDER COATINGS (a-13)

100 parts of acrylic resin (a-10) obtained in Reference Example 10, 24 parts of decane dicarboxylic acid and 30 parts of titanium oxide were dry-mixed in a Henshel mixer (trademark, Mitui-miike Seisakusho). Next, the mixture was melt-kneaded in Co-keader PR-46 (manufactured by Bus in Swizerland) at 100° C. and then allowed to cool. The solid mass was pulverized in a hammer mill and shieved with a 150 mesh wire screen to obtain powder coatings (a-13).

REFERENCE EXAMPLE 14

PREPARATION OF ACRYLIC RESIN POWDER COATINGS (a-14)

100 parts of acrylic resin (a-11) obtained in Reference Example 11, 24 parts of decane dicarboxylic acid and 30 parts of titanium oxide were dry-mixed in a Henshel mixer (trademark, Mitui-miike Seisakusho). Next, the mixture was melt-kneaded in Co-keader PR-46 (manufactured by Bus in Swizerland) at 100° C. and then allowed to cool. The solid mass was pulverized in a hammer mill and shieved with a 150 mesh wire screen to obtain powder coatings (a-14).

REFERENCE EXAMPLE 15

PREPARATION OF EPOXY RESIN POWDER COATINGS (a-15)

100 parts of Epotohto YD-019 (epoxy resin manufactured by Tohto Kasei K.K., trademark), 3 parts of dicyandiamide and 40 parts of titanium oxide were dry-mixed in a Henshel mixer (trademark, Mitui-miike Seisakusho). Next, the mixture was melt-kneaded in Co-keader PR-46 (manufactured by Bus in Swizerland) at 100° C. and then allowed to cool. The solid mass was pulverized in a hammer mill and shieved with a 150 mesh wire screen to obtain powder coatings (a-15).

EXAMPLE 1

UNCROSSLINKED RESIN MICROPARTICLES A-1, 1% ADDITION

To 99 parts of the powder coatings (a-12) obtained in Reference Example 12, 1 part of the uncrosslinked resin microparticles (a-1) obtained in Reference Example 1 was added and the combined was dry-mixed in Henshel mixer for 30 seconds to obtain powder coatings (A-1).

EXAMPLE 2

UNCROSSLINKED RESIN MICROPARTICLES A-4, 1% ADDITION

To 99 parts of the powder coatings (a-12) obtained in Reference Example 12, 1 part of the uncrosslinked resin microparticles (a-4) obtained in Reference Example 4 was added and the combined was dry-mixed in Henshel mixer for 30 seconds to obtain powder coatings (A-2).

COMPARATIVE EXAMPLE 1

UNCROSSLINKED RESIN MICROPARTILCES A-3, 1% ADDITION

To 99 parts of the powder coatings (a-12) obtained in Reference Example 12, 1 part of the uncrosslinked resin microparticles (a-3) obtained in Reference Example 3 was added and the combined was dry-mixed in Henshel mixer for 30 seconds to obtain powder coatings (CA-1).

EXAMPLE 3

UNCROSSLINKED RESIN MICROPARTICLES A-5, 0.5% ADDITION

To 99.9 parts of the powder coatings (a-12) obtained in Reference Example 12, 0.5 part of the uncrosslinked resin microparticles (a-5) obtained in Reference Example 5 was added and the combined was dry-mixed in Henshel mixer for 30 seconds to obtain powder coatings (A-3).

COMPARATIVE EXAMPLE 2

UNCROSSLINKED RESIN MICROPARTICLES A-6, 0.5% ADDITION

To 99.9 parts of the powder coatings (a-12) obtained in Reference Example 12, 0.5 part of the uncrosslinked resin microparticles (a-6) obtained in Reference Example 6 was added and the combined was dry-mixed in Henshel mixer for 30 seconds to obtain powder coatings (CA-2).

EXAMPLE 4

UNCROSSLINKED RESIN MICROPARTICLES A-1, 5% ADDITION

To 95 parts of the powder coatings (a-12) obtained in Reference Example 12, 5 parts of the uncrosslinked resin microparticles (a-1) obtained in Reference Example 1 were added and the combined was dry-mixed in Henshel mixer for 30 seconds to obtain powder coatings (A-4).

COMPARATIVE EXAMPLE 3

UNCROSSLINKED RESIN MICROPARTICLES A-1, 0.01% ADDITION

To 99.99 parts of the powder coatings (a-12) obtained in Reference Example 12, 0.01 part of the uncrosslinked resin microparticles (a-1) obtained in Reference Example 1 was added and the combined was dry-mixed in Henshel mixer for 30 seconds to obtain powder coatings (CA-3).

COMPARATIVE EXAMPLE 4

UNCROSSLINKED RESIN MICROPARTICLES A-1, 30% ADDITION

To 70 parts of the powder coatings (a-12) obtained in Reference Example 12, 30 parts of the uncrosslinked resin microparticles (a-1) obtained in Reference Example 1 were added and the combined was dry-mixed in Henshel mixer for 30 seconds to obtain powder coatings (CA-4).

EXAMPLE 5

CROSSLINKED RESIN MICROPARTICLES A-7, 1.5% ADDITION

To 98.5 parts of the powder coatings (a-12) obtained in Reference Example 12, 1.5 parts of the crosslinked resin microparticles (a-7) obtained in Reference Example 7 were added and the combined was dry-mixed in Henshel mixer for 30 seconds to obtain powder coatings (A-5).

EXAMPLE 6

CROSSLINKED RESIN MICROPARTICLES A-8, 1.5% ADDITION

To 98.5 parts of the powder coatings (a-12) obtained in Reference Example 12, 1.5 parts of the crosslinked resin microparticles (a-8) obtained in Reference Example 8 were added and the combined was dry-mixed in Henshel mixer for 30 seconds to obtain powder coatings (A-6).

EXAMPLE 7

UNCROSSLINKED RESIN MICROPARTICLES A-1, 5% ADDITION/ACRYLIC RESIN POWDER

To 95 parts of the powder coatings (a-14) obtained in Reference Example 14, 5 parts of the uncrosslinked resin microparticles (a-1) obtained in Reference Example 1 were added and the combined was dry-mixed in Henshel mixer for 30 seconds to obtain powder coatings (A-7).

COMPARATIVE EXAMPLE 5

CONTAINING NO RESIN MICROPARTICLES

Acrylic resin powder coatings (a-14) obtained in Reference Example 14 was used as comparative powder coatings (CA 5).

EXAMPLE 8

UNCROSSLINKED RESIN MICROPARTICLES A-1, 1% ADDITION/EPOXY RESIN POWDER

To 99 parts of the powder coatings (a-15) obtained in Reference Example 15, 1 part of the uncrosslinked resin microparticles (a-1) obtained in Reference Example 1 was added and the combined was dry-mixed in Henshel mixer for 30 seconds to obtain powder coatings (A-8).

COMPARATIVE EXAMPLE 6

CONTAINING NO RESIN MICROPARTICLES

Epoxy resin powder coatings (a-15) obtained in Reference Example 15 was used as comparative powder coatings (CA-6).

EXAMPLE 9

UNCROSSLINKED RESIN MICROPARTICLES A-1, 1% ADDITION/POLYESTER RESIN POWDER

To 99 parts of the powder coatings (a-12) obtained in Reference Example 12, 1 part of the uncrosslinked resin microparticles (a-1) obtained in Reference Example 1 was added and the combined was dry-mixed in Henshel mixer for 30 seconds to obtain powder coatings (A-9).

COMPARATIVE EXAMPLE 7

CONTAINING NO RESIN MICROPARTICLES

Polyester resin powder coatings (a-12) obtained in Reference Example 12 was used as comparative powder coatings (CA 7). Thus obtained powder coatings A-1 to A-9 and CA-1 to CA-7 were evaluated as follows:

1) Blocking resistance test:

The test powder was stored at 40° C. for 1 month and thereafter the flow property of the powder coatings was visually examined. Blocking resistance was evaluated by the following criteria:

O . . . . no mass, excellent flow

Δ. . . . . certain re-pulverizable masses

X ..... many unpulverizable masses

2) Coating appearance test:

The test powder was applied onto a soft steel plate previously treated with a zinc phosphate bath, to a film thickness of 30 to 40μ by an electrostatic coating and the coating was baked at 180° C. for 20 minutes. The coating appearance was visually examined and evaluated.

O ...... good
Δ ...... slight reduction in gloss and certain rounds
X ...... no good, almost no gloss, many rounds 3) Stain resistance tests:

(a) Magic ink stain resistance:

Magic ink lines were drawn on the test coating and after elapsing 1 day, said lines were slightly mopped with gauze moistened with methanol.

O ..... no trace of magic ink
Δ ...... slight trace of magic ink
X ...... distinct and clear magic ink lines (b) Smoke stain resistance:

Into a closed test room filled with tobacco smoke, the test plate was kept standing for 24 hours. Thereafter, the test plate was washed with water using a neutral detergent and degree of remaining smoke-strain was examined by naked eyes and by color difference (Δb) between colored portion and original uncolored portion O ...... color difference (Δb) is less than 0.3
Δ ...... color difference (Δb) is from 0.3 to less than 1
...... color difference (Δb) is 1 or more The test results are shown in Table 1.

REFERENCE EXAMPLE 16

PREPARATION OF UNCROSSLINKED RESIN MICROPARTICLES (A-16)

Into a reaction flask fitted with a stirrer, a condenser and a thermoregulator, were placed 380 parts of deionized water and 2 parts of nonionic surfactant MON2 (trademark, Sanyo Kasei K.K.) and the mixture was heated under stirring at 80° C. to get a clear solution. To this, a solution of 1 part of ammonium persulfate (initiator) in 10 parts of deionized water was added and then a mixture of 19 parts of 2-hydroxyethyl methacrylate, 20 parts of styrene and 61 parts of n-butyl methacrylate was dropwise added in 60 minutes. After completion of said addition, the combined was stirred at 80° C. for 60 minutes to obtain an emulsion having a non-volatile content of 20%, average diameter of the emulsion being 0.03 to 0.05 μ. This emulsion was then subjected to a spray-drying to obtain resin microparticles (a 16) having SP 10.0 and Tg 40° C.

REFERENCE EXAMPLE 17

PREPARATION OF UNCROSSLINKED RESIN MICROPARTICLES (A-17)

Into a reaction flask fitted with a stirrer, a condenser and a thermoregulator, were placed 380 parts of deionized water and 2 parts of nonionic surfactant MON2 (trademark, Sanyo Kasei K.K.) and the mixture was heated under stirring at 80° C. to get a clear solution. To this, a solution of 1 part of ammonium persulfate (initiator) in 10 parts of deionized water was added and then a mixture of 85 parts of methyl methacrylate, 5 parts of styreene and 10 parts of n-butyl methacrylate was dropwise added in 60 minutes. After completion of said addition, the combined was stirred at 80° C. for 60 minutes to obtain an emulsion having a non volatile content of 20%, average diameter of the emulsion being 0.03 to 0.05μ. This emulsion was then subjected to a spray-drying to obtain resin microparticles (a-17) having SP 10.5 and Tg 100° C.

REFERENCE EXAMPLE 18

PREPARATION OF UNCROSSLINKED RESIN MICROPARTICLES (A-18)

Into a reaction flask fitted with a stirrer, a condenser and a thermoregulator, were placed 380 parts of deionized water and 2 parts of nonionic surfactant MON2 (trademark, Sanyo Kasei K.K.) and the mixture was heated under stirring at 80° C. to get a clear solution. To this, a solution of 1 part of ammonium persulfate (initiator) in 10 parts of deionized water was added and then a mixture of 85 parts of methyl methacrylate, 5 parts of styrene and 10 parts of n-butyl methacrylate was dropwise added in 60 minutes. After completion of said addition, the combined was stirred at 80° C. for 60 minutes to obtain an emulsion having a nonvolatile content of 20%, average diameter of the emulsion being 0.3μ. This emulsion was then subjected to a spray-drying to obtain resin microparticles (a-18) having SP 10.5 and Tg 100° C.

REFERENCE EXAMPLE 19

PREPARATION OF UNCROSSLINKED RESIN MICROPARTICLES (A-19)

Into a reaction flask fitted with a stirrer, a condenser and a thermoregulator, were placed 380 parts of deionized water and 2 parts of nonionic surfactant MON2 (trademark, Sanyo Kasei K.K.) and the mixture was heated under stirring at 80° C. to get a clear solution. To this, a solution of 1 part of ammonium persulfate (initiator) in 10 parts of deionized water was added and then a mixture of 61 parts of methyl methacrylate, 36 parts of styreene and 3 parts of n-butyl methacrylate was dropwise added in 60 minutes. After completion of said addition, the combined was stirred at 80° C. for 60 minutes to obtain an emulsion having a nonvolatile content of 20%, average diameter of the emulsion being 0.03 to 0.05μ. This emulsion was then subjected to a spray-drying to obtain resin microparticles (a-19) having SP 10.0 and Tg 110° C.

REFERENCE EXAMPLE 20

PREPARATION OF UNCROSSLINKED RESIN MICROPARTIUCLES (A-20) BY PULVERIZATION METHOD

The acrylic resin (a-26) hereinafter mentioned in Reference Example 26 having Tg value of 90° C. was pulverized by means of grinder to obtain uncrosslinked resin microparticles (a-20) having an average diameter of 15μ.

REFERANCE EXAMPLE 21

PREPARATION OF UNCROSSLINKED RESIN MICROPARTIUCLES (A-21) BY PULVERIZATION METHOD

The acrylic resin (a-26) hereinafter mentioned in Reference Example 26 having Tg value of 90° C. was pulverized by means of grinder to obtain uncrosslinked resin microparticles (a-21) having an average diameter of 0.5μ.

REFERENCE EXAMPLE 22

Epoxy resin YD-019 (trademark, manufactured by Tohto Kasei K.K.) was pulverized by means of grinder to obtain uncrosslinked epoxy resin microparticles having an average diameter of 0.5μ.(a-22)

REFERENCE EXAMPLE 23

PREPARATION OF CROSSLINKED RESIN MICROPARTICLES (A-23)

Into a reaction flask fitted with a stirrer, a condenser and a thermoregulator, were placed 282 parts of deionized water, 2 parts of nonionic surfactant MON2 (trademark, Sanyo Kasei K.K.) and dimethylethanolamine and the mixture was heated under stirring at 80° C. to get a clear solution. To this, a solution of 4.5 parts of azo-biscyano valeric acid in 45 parts of deionized water and 4.3 parts of dimethyl ethanolamine was added and then a mixture of 70.7 parts of styrene, 94.2 parts of n-butyl acrylate, 70.7 parts of methyl methacrylate, 30 parts of 2-hydroxyethyl acrylate and 4.5 parts of ethyleneglycol dimethyl methacrylate was dropwise added in 60 minutes. Thereafter, a solution of 1.5 parts of azo-biscyano valeric acid in 15 parts of deionized water and 1.4 parts of dimethylethanolamine was added. After completion of said addition, the combined was stirred at 80° C. for 60 minutes to obtain an emulsion having a non-volatile content of 45%, average diameter of the emulsion being 0.16μ. This emulsion was then subjected to a spray-drying to obtain resin microparticles (a-23) having SP 10.18 and Tg 85° C.

REFERENCE EXAMPLE 24

PREPARATION OF TG 70 ACRYLIC RESIN (A-24)

Into a reaction flask fitted with a dropping funnel, a stirrer and a thermometer, were placed 80 parts of xylene and heated to 130° C. To this, a solution of 55 parts of methyl methacrylate, 10 parts of styrene, 30 parts of glycidyl methacrylate, 5 parts of n-butyl methacrylate and 6 parts of Kayaester O (initiator) was dropwise added from a dropping funnel in 3 hours. After completion of said addition, the content was maintained at the same temperature for 30 minutes and then a mixture of 20 parts of xylene and 1 part of Kayaester O was dropwise added in 1 hour. Thereafter, the combined was maintained at 130° C. for 2 hours and xylene was distilled off in vaccuo to obtain an acrylic resin (a-24) having Tg=70° C.

REFERENCE EXAMPLE 25

PREPARATION OF TG 40 ACRYLIC RESIN (A-25)

Into a reaction flask fitted with a dropping funnel, a stirrer and a thermometer, were placed 80 parts of xylene and heated to 130° C. To this, a solution of 19 parts of methyl methacrylate, 10 parts of styrene, 30 parts of glycidyl methacrylate, 41 parts of n-butyl methacrylate and 6 parts of Kayaester O (initiator) was dropwise added from a dropping funnel in 3 hours. After completion of said addition, the content was maintained at the same temperature for 30 minutes and then a mixture of 20 parts of xylene and 1 part of Kayaester O was dropwise added in 1 hour. Thereafter, the combined was maintained at 130° C. for 2 hours and xylene was distilled off in vaccuo to obtain an acrylic resin (a-25) having Tg=40° C.

REFERENCE EXAMPLE 26

PREPARATION OF TG b πACRYLIC RESIN (A-26)

Into a reaction flask fitted with a dropping funnel, a stirrer and a thermometer, were placed 80 parts of xylene and heated to 130° C. To this, a solution of 36 parts of methyl methacrylate, 10 parts of styrene, 24 parts of glycidyl methacrylate, 24 parts of n-butyl methacrylate, 30 parts of t-butyl methacrylate and 6 parts of Kayaester O (initiator) was dropwise added from a dropping funnel in 3 hours. After completion of said addition, the content was maintained at the same temperature for 30 minutes and then a mixture of 20 parts of xylene and 1 part of Kayaester O was dropwise added in 1 hour. Thereafter, the combined was maintained at 130° C. for 2 hours and xylene was distilled off in vaccuo to obtain an acrylic resin (a-26) having Tg=90° C.

REFERENCE EXAMPLE 27

PREPARATION OF ACRYLIC RESIN POWDER COATINGS (A-27)

100 parts of acrylic resin (a-24) obtained in Reference Example 24, 24 parts of decane dicarboxylic acid and 30 parts of titanium oxide were dry-mixed in a Henshel mixer (trademark, Mitui-miike Seisakusho). Next, the mixture was melt-kneaded in Co-keader PR-46 (manufactured by Bus in Swizerland) at 100° C. and then allowed to cool. The solid mass was pulverized in a hammer mill and shieved with a 150 mesh wire screen to obtain powder coatings (a-27).

REFERENCE EXAMPLE 28

PREPARATION OF POLYESTER POWDER COATINGS (A-28)

100 parts of ER 6800 (polyester resin, trademark, Nihon Polyester Co.), 36 parts of Krelan UI (trademark, blocked isocyanate, manufactured by BASF) and 40 parts of titanium oxide were dry-mixed in a Henshel mixer (trademark, Mitui-miike Seisakusho). Next, the mixture was melt-kneaded in Co-keader PR-46 (manufactured by Bus in Swizerland) at 100° C. and then allowed to cool. The solid mass was pulverized in a hammer mill and shieved with a 150 mesh wire screen to obtain powder coatings (a-28).

REFERENCE EXAMPLE 29

PREPARATION OF EPOXY RESIN POWDER COATINGS (A-29)

100 parts of Epotohto YD-019 (epoxy resin, manufactured by Tohto Kasei K.K., trademark), 3 parts of dicyandiamide and 40 parts of titanium oxide were dry-mixed in a Henshel mixer (trademark, Mitui-miike Seisakusho). Next, the mixture was melt-kneaded in Co-keader PR-46 (manufactured by Bus in Swizerland) at 100° C. and then allowed to cool. The solid mass was pulverized in a hammer mill and shieved with a 150 mesh wire screen to obtain powder coatings (a-29).

REFERENCE EXAMPLE 30

PREPARATION OF TG 40 ACRYLIC RESIN POWDER COATINGS (A-30)

100 parts of acrylic resin (a-25) obtained in Reference Example 25 and 24 parts of decane dicarboxylic acid were dry-mixed in a Henshel mixer (trademark, Mitui-miike Seisakusho). Next, the mixture was melt-kneaded in Co-keader PR-46 (manufactured by Bus in Swizerland) at 100° C. and then allowed to cool. The solid mass was pulverized in a hammer mill and shieved with a 150 mesh wire screen to obtain powder coatings (a-30).

EXAMPLE 10

UNCROSSLINKED RESIN MICROPARTICLES A-17, 1% ADDITION

To 99 parts of the powder coatings (a-27) obtained in Reference Example 27, 1 part of the uncrosslinked resin microparticles (a-17) obtained in Reference Example 17 was added and the combined was dry-mixed in Henshel mixer for 30 seconds to obtain powder coatings (A-10).

COMPARATIVE EXAMPLE 8

To 99 parts of the powder coatings (a-27) obtained in Reference Example 27, 1 part of the uncrosslinked resin microparticles (a-16) obtained in Reference Example 16 was added and the combined was dry-mixed in Henshel mixer for 30 seconds to obtain powder coatings (CA-8).

EXAMPLE 11

UNCROSSLINKED RESIN MICROPARTICLES A-18, 1% ADDITION

To 99 parts of the powder coatings (a 27) obtained in Reference Example 27, 1 part of the uncrosslinked resin microparticles (a-18) obtained in Reference Example 18 was added and the combined was dry-mixed in Henshel mixer for 30 seconds to obtain powder coatings (A-11).

COMPARATIVE EXAMPLE 9

UNCROSSLINKED RESIN MICROPARTICLES A-20, 1% ADDITION

To 99 parts of the powder coatings (a-27) obtained in Reference Example 27, 1 part of the uncrosslinked resin microparticles (a-20) obtained in Reference Example 20 was added and the combined was dry-mixed in Henshel mixer for 30 seconds to obtain powder coatings (CA-9).

EXAMPLE 12

UNCROSSLINKED RESIN MICROPARTICLES A-18, 20%, ADDITION

To 80 parts of the powder coatings (a-27) obtained in Reference Example 27, 20 parts of the uncrosslinked resin microparticles (a-18) obtained in Reference Example 18 were added and the combined was dry-mixed in Henshel mixer for 30 seconds to obtain powder coatings (A-12).

COMPARATIVE EXAMPLE 10

UNCROSSLINKED RESIN MICROPARTICLES A-19, 0.01% ADDITION

To 99.99 parts of the powder coatings (a-27) obtained in Reference Example 27, 0.01 part of the uncrosslinked resin microparticles (a-19) obtained in Reference Example 19 was added and the combined was dry-mixed in Henshel mixer for 30 seconds to obtain powder coatings (CA-10).

COMPARATIVE EXAMPLE 11

UNCROSSLINKED RESIN MICROPARTICLES A-19, 40% ADDITION

To 60 parts of the powder coatings (a-27) obtained in Reference Example 27, 40 parts of the uncrosslinked resin microparticles (a-19) obtained in Reference Example 19 were added and the combined was dry-mixed in Henshel mixer for 30 seconds to obtain powder coatings (CA-11).

COMPARATIVE EXAMPLE 12

ACRYLIC RESIN POWDER COATINGS CONTAINING NO RESIN MICROPARTICLES

The acrylic resin powder coatings obtained in Reference Example 27 was used as comparative powder coatings (CA-12).

EXAMPLE 13

UNCROSSLINKED RESIN MICROPARTICLES A-17, 1% ADDITION /POLYESTER RESIN POWDER

To 99 parts of the powder coatings (a-28) obtained in Reference Example 28, 1 part of the uncrosslinked resin microparticles (a-17) obtained in Reference Example 17 was added and the combined was dry-mixed in Henshel mixer for 30 seconds to obtain powder coatings (A-13).

EXAMPLE 14

UNCROSSLINKED RESIN MICROPARTICLES A-17, 1% ADDITION/EPOXY RESIN POWDER

To 99 parts of the powder coatings (a-29) obtained in Reference Example 29, 1 part of the uncrosslinked resin microparticles (a-17) obtained in Reference Example 17 was added and the combined was dry-mixed in Henshel mixer for 30 seconds to obtain powder coatings (A-14).

EXAMPLE 15

UNCROSSLINKED RESIN MICROPARTICLES A-21, 1% ADDITION

To 99 parts of the powder coatings (a-27) obtained in Reference Example 27, 1 part of the uncrosslinked resin microparticles (a-21) obtained in Reference Example 21 was added and the combined was dry-mixed in Henshel mixer for 30 seconds to obtain powder coatings (A-15).

EXAMPLE 16

UNCROSSLINKED RESIN MICROPARTICLES A-22, 1% ADDITION

To 99 parts of the powder coatings (a-27) obtained in Reference Example 27, 1 part of the uncrosslinked resin microparticles (a-22) obtained in Reference Example 22 was added and the combined was dry-mixed in Henshel mixer for 30 seconds to obtain powder coatings (A-16).

EXAMPLE 17

UNCROSSLINKED RESIN MICROPARTICLES A-17, 5% ADDITION/ACRYLIC RESIN POWDER

To 95 parts of the powder coatings (a-30) obtained in Reference Example 30, 5 parts of the uncrosslinked resin microparticles (a-17) obtained in Reference Example 17 were added and the combined was dry-mixed in Henshel mixer for 30 seconds to obtain powder coatings (A-17).

EXAMPLE 18

CROSSLINKED RESIN MICROPARTICLES A-23, 20% ADDITION

To 80 parts of the powder coatings (a-27) obtained in Reference Example 27, 20 parts of the crosslinked resin microparticles (a-23) obtained in Reference Example 23 were added and the combined was dry-mixed in Henshel mixer for 30 seconds to obtain powder coatings (A-18).

COMPARATIVE EXAMPLE 13 CONTAINING NO RESIN MICROPARTICLES

Acrylic resin powder coatings (a-30) obtained in Reference Example 30 was used as comparative powder coatings (CA-13). The respective powder coatings A-10 to A-18 and CA-8 to CA-13 were evaluated as previously mentioned and test results were shown in Table 2.

REFERENCE EXAMPLE 31

PREPARATION OF UNCROSSLINKED RESIN MICROPARTICLES CONTAINING FUNCTIONAL FUNCTIONAL MATERIAL INTRODUCED BY COPOLYMERIZATION MEANS

Into a reaction flask fitted with a stirrer, a condenser and a thermometer, were placed 380 parts of deionized water and 2 parts of nonionic surfactant MON2 (trademark, Sanyo Kasei K.K.) and the mixture was stirrered at 80° C. to obtain a clear solution. To this, a solution of 1 part of ammonium persulfate (initiator) in 10 parts of deionized water and then a mixture of 10 parts of Permasoap MA (trademark, polymerizable UV absorber, Kanebo K.K.), 85 parts of methyl methacrylate, 1 part of styrene and 14 parts of n-butyl methacrylate was dropwise added in 60 minutes. After completion of said addition, the combined was sirred at 80° C. for 60 minutes to obtain an emulsion having a nonvolatile content of 20% and emulsion particle size of 0.03 to 0.05 $\mu$. This emulsion was then subjected to a spray-drying to obtain resin microparticles (a-31) having Tg=110° C. and SP=10.6.

REFERENCE EXAMPLE 32

PREPARATION OF UNCROSSLINKED RESIN MICROPARTICLES CONTAINING FUNCTIONAL FUNCTIONAL MATERIAL INTRODUCED BY COPOLYMERIZATION MEANS

Into a reaction flask fitted with a stirrer, a condenser and a thermometer, were placed 380 parts of deionized water and 2 parts of nonionic surfactant MON2 (trademark, Sanyo Kasei K.K.) and the mixture was stirrered at 80° C. to obtain a clear solution. To this, a solution of 1 part of ammonium persulfate (initiator) in 10 parts of deionized water and then a mixture of 10 parts of T-17 (trademark, polymerizable UV absorber, Adeca Agas Co.), 53 parts of methyl methacrylate, 22 parts of styrene and 25 parts of 2 hydroxyethyl methacrylate was dropwise added in 60 minutes. After completion of said addition, the combined was sirred at 80° C. for 60 minutes to obtain an emulsion having a non- volatile content of 20% and emulsion particle size of 0.03 to 0.0 $\mu$. This emulsion was then subjected to a spray-drying to obtain resin microparticles (a-32) having Tg=90° C. and SP=11.

REFERENCE EXAMPLE 33

PREPARATION OF UNCROSSLINKED RESIN MICROPARTICLES CONTAINING FUNCTIONAL FUNCTIONAL MATERIAL INTRODUCED BY COPOLYMERIZATION MEANS

Into a reaction flask fitted with a stirrer, a condenser and a thermometer, were placed 380 parts of deionized water and 2 parts of nonionic surfactant MON2 (trademark, Sanyo Kasei K.K.) and the mixture was stirrered at 80° C. to obtain a clear solution. To this, a solution of 1 part of ammonium persulfate (initiator) in 10 parts of deionized water and then a mixture of 10 parts of MARK LA-21 (trademark, polymerizable UV absorber, Adeca Agas Co.), 31 parts of methyl methacrylate, 46 parts of styrene and 23 parts of 2-hydroxyethyl methacrylate was dropwise added in 60 minutes. After completion of said addition, the combined was sirred at 80° C. for 60 minutes to obtain an emulsion having a nonvolatile content of 20% and emulsion particle size of 0.03 to 0.05 $\mu$. This emulsion was then subjected to a spray-drying to obtain resin microparticles (a-33) having Tg=100° C. and SP=10.5.

REFERENCE EXAMPLE 34

PREPARATION OF UNCROSSLINKED RESIN MICROPARTICLES CONTAINING FUNCTIONAL MATERIAL INTRODUCED BY COPOLYMERIZATION MEANS THROUGH PULVERIZATION

Tg 70 acrylic resin (a-41) synthesized in hereinunder mentioned Reference Example 41 was pulverized by using grinder to obtain uncrosslinked acrylic resin microparticles (a-34) having an average diameter of 0.5 $\mu$.

REFERENCE EXAMPLE 35

PREPARATION OF UNCROSSLINKED RESIN MICROPARTICLES CONTAINING FUNCTIONAL MATERIAL INTRODUCED BY COPOLYMERIZATION MEANS THROUGH PULVERIZATION

Tg 70 acrylic resin (a-41) synthesized in hereinunder mentioned Reference Example 41 was pulverized by using grinder to obtain uncrosslinked acrylic resin microparticles (a-35) having an average diameter of 15 $\mu$.

REFERENCE EXAMPLE 36

PREPARATION OF CROSSLINKED RESIN MICROPARTICLES CONTAINING FUNCTIONAL FUNCTIONAL MATERIAL INTRODUCED BY COPOLYMERIZATION MEANS

Into a reaction flask fitted with a stirrer, a thermometer, were placed 282 parts of deionized water, 2 parts of nonionic surfactant MON2 (trademark, Sanyo Kasei K.K.) and dimethylethanolamine and the mixture was stirrered at 80° C. to obtain a clear solution. To this, a solution of 4.5 parts of azo-biscyano valeric acid (initiator) in 45 parts of deionized water and 4.3 parts of dimethylethanol amine and then a mixture of 10 parts of Permasoap MA (trademark, polymerizable UV absorber, Kanebo K.K.), 70.7 parts of styrene, 94.2 parts of n-butyl acrylate, 70.7 parts of methyl methacrylate, 30 parts of 2-hydroxyethylacrylate and 4.5 parts of ethyleneglycol dimethylmethacrylate was dropwise added in 60 minutes. Thereafter, a solution of 1.5 parts of azo-biscyano valeric acid in 15 parts of deionized water and 1.4 parts of dimethylethanolamine was further added. After completion of said addition, the combined was sirred at 80° C. for 60 minutes to obtain an emulsion having a non-volatile content of 45% and emulsion particle size of 0.16μ. This emulsion was then subjected to a spray-drying to obtain resin microparticles (a-36) having Tg=85° C. and SP=10.18.

REFERENCE EXAMPLE 37

PREPARATION OF CROSSLINKED RESIN MICROPARTICLES CONTAINING FUNCTIONAL FUNCTIONAL MATERIAL INTRODUCED BY COPOLYMERIZATION MEANS

Into a reaction flask fitted with a stirrer, a condenser and a thermometer, were placed 282 parts of deionized water, 2 parts of nonionic surfactant MON2 (trademark, Sanyo Kasei K.K.) and dimethylethanolamine and the mixture was stirrered at 80 ° C. to obtain a clear solution. To this, a solution of 4.5 parts of azo-biscyano valeric acid (initiator) in 45 parts of deionized water and 4.3 parts of dimethylethanol amine and then a mixture of 10 parts of T-1 (trademark, polymerizable UV absorber, Adeca Agas Co. ), 70.7 parts of styrene, 94.2 parts of n-butyl acrylate, 70.7 parts of methyl methacrylate, 30 parts of 2-hydroxyethylacrylate and 4.5 parts of ethyleneglycol dimethacrylate was dropwise added in 60 minutes. Thereafter, a solution of 1.5 parts of azobiscyano valeric acid in 15 parts of deionized water and 1.4 parts of dimethylethanolamine was further added. After completion of said addition, the combined was sirred at 80° C. for 60 minutes to obtain an emulsion having a non-volatile content of 45% and emulsion particle size of 0.2μ. This emulsion was then subjected to a spray-drying to obtain resin microparticles (a-37) having Tg=85° C. and SP=10.18.

REFERENCE EXAMPLE 38

PREPARATION OF CROSSLINKED RESIN MICROPARTICLES CONTAINING FUNCTIONAL FUNCTIONAL MATERIAL INTRODUCED BY ADSORPTION MEANS

Into a reaction flask fitted with a stirrer and a thermoregulator, were placed 216 parts of deionized water and maintained at 80° C. under stirring. To this, a solution of 4.5 parts of azo-biscyano valeric acid (initiator) in 45 parts of deionized water and 4.28 parts of dimethylethanol amine and then, while maintaining the same temperature, a mixture of 6 parts of N,N-dimethyl-N-(3-sulfopropyl)-N-methacryloxyethyl-ammonium betaine, 6 parts of 2-hydroxyethyl acrylate and 90 parts of deionized water and a mixture of 69 parts of methyl methacrylate, 103 parts of n-butyl acrylate, 77 parts of styrene, 24 parts of 2-hydroxyethyl acrylate and 15 parts of ethyleneglycol dimethacrylate were simultaneously and dropwise added in 60 minutes. Thereafter, a solution of 1.5 parts of azo-biscyano valeric acid in 15 parts of deionized water and 1.42 parts of dimethyl ethanolamine was further added. After completion of said addition, the combined was sirred at 80° C. for 60 minutes to obtain an emulsion having a non-volatile content of 45%, emulsion particle size of 0.116 μ and having a single diameter distribution. Next, 90 parts of 10% bis(2,2,6,6-tetramethyl-4-piperidinyl) sebacate (UV absorber) xylene solution were added thereto and the combined was stirred at 60° C. for 1 day. Xylene was removed off azeotropically and the residue was subjected to a spray-drying to obtain powdery resin microparticles (a-38) having Tg=80° C. and SP=10.0 .

REFERENCE EXAMPLE 39

PREPARATION OF CROSSLINKED RESIN MICROPARTICLES CONTAINING FUNCTIONAL FUNCTIONAL MATERIAL INTRODUCED BY MIXING WITH MONOMER MIXTURE TO BE POLYMERIZED

Into a reaction flask fitted with a stirrer and a thermoregulator, were weighed 900 parts of deionized water, 1.5 parts of Methorose 60SK-50 (trademark, methyl cellulose, Shinetsu Kagaku K.K.), 200 parts of methyl methacrylate, 60 parts of 2-ethylhexyl acrylate, 1.5 parts of methacrylic acid, 2.5 parts of glycidyl methacrylate, 6 parts of 2-(2'-oxy-5'-methylphenyl)benzotriazole (UV absorber) and 6 parts of azobisisobutyronitrile and the mixture was reacted, while stirring at 250 rpm, at 65° C. for 7 hours. Thus obtained suspension was filtered through 200 mesh shieve to obtain pearl powder having an average diameter of 20 to 600 μ. This was then pulverized by means of ball mill for 48 hours to obtain crosslinked resin particles (a-39) having an average diameter of 4.5μ. SP=11.6, Tg=69° C.

REFERENCE EXAMPLE 40

PREPARATION OF TG 40 ACRYLIC RESIN PARTICLES (A-40)

Into a reaction flask fitted with a dropping funnel, a stirrer and a thermometer, were placed 80 parts of xylene and heated to 130° C. To this, a solution of 30 parts of methyl methacrylate, 10 parts of styrene, 30 parts of glycidyl methacrylate, 41 parts of n-butyl methacrylate and 6 parts of Kayaester O (initiator) was dropwise added from a dropping funnel in 3 hours. After completion of said addition, the content was maintained at the same temperature for 30 minutes and then a mixture of 20 parts of xylene and 1 part of Kayaester O was dropwise added in 1 hour. Thereafter, the combined was maintained at 130° C. for 2 hours and xylene was distilled off in vaccuo to obtain an acrylic resin. This was then pulverized to obtain acrylic resin microparticles (a-40) having an average diameter of 0.5 μ, SP value of 9.8 and Tg value of 40° C.

REFERENCE EXAMPLE 41

PREPARATION OF TG 70 ACRYLIC RESIN (A-41)

Into a reaction flask fitted with a dropping funnel, a stirrer and a thermometer, were placed 80 parts of xylene and heated to 130° C. To this, a solution of 55 parts of methyl methacrylate, 10 parts of styrene, 30 parts of glycidyl methacrylate, 5 parts of n-butyl methacrylate and 6 parts of Kayaester O (initiator) was dropwise added from a dropping funnel in 3 hours. After completion of said addition, the content was maintained at the same temperature for 30 minutes and then a mixture of 20 parts of xylene and 1 part of Kayaester O was dropwise added in 1 hour. Thereafter, the combined was maintained at 130° C. for 2 hours and xylene was distilled off in vaccuo to obtain an acrylic resin (a-41) having Tg=70° C.

REFERENCE EXAMPLE 42

PREPARATION OF TG 90° ACRYLIC RESIN MICROPARTICLES (A-42) CONTAINING FUNCTIONAL MATERIAL INTRODUCED BY THE COPOLYMERIZATION MEANS.

Into a reaction flask fitted with a dropping funnel, a stirrer and a thermometer, were placed 80 parts of xylene and heated to 130° C. To this, a solution of 55 parts of methyl methacrylate, 10 parts of T-17 (trademark, polymerizable UV absorber, Adeka Argus Co.), 10 parts of styrene, 30 parts of glycidyl methacrylate, 5 parts of n-butyl methacrylate and 6 parts of Kayaester O (initiator) was dropwise added from a dropping funnel in 3 hours. After completion of said addition, the content was maintained at the same temperature for 30 minutes and then a mixture of 20 parts of xylene and 1 part of Kayaester O was dropwise added in 1 hour. Thereafter, the combined was maintained at 130° C. for 2 hours and xylene was distilled off in vaccuo to obtain an acrylic resin. This was then pulverized to obtain uncrosslinked acrylic resin microparticles (a-42) having an average diameter of 0.5 μ, Tg=70° C. and SP=10.2

REFERENCE EXAMPLE 43

PREPARATION OF POLYESTER POWDER COATINGS (A-43)

100 parts of ER 6800 (polyester resin, trademark, Nihon Polyester Co.), 36 parts of Krelan UI (trademark, blocked isocyanate, manufactured by BASF) and 40 parts of titanium oxide were dry-mixed in a Henshel mixer (trademark, Mitui-miike Seisakusho). Next, the mixture was melt-kneaded in Co keader PR-46 (manufactured by Bus in Swizerland) at 100° C. and then allowed to cool. The solid mass was pulverized in a hammer mill and shieved with a 150 mesh wire screen to obtain powder coatings (a-43).

REFERENCE EXAMPLE 44

PREPARATION OF POLYESTER POWDER COATINGS (A-44)

100 parts of D-19-5 (polyester resin, trademark, Nihon Ubica Co.), 10 parts of YD-128 (trademark, epoxy resin, manufactured by Tohto Kase K.K.) and 60 parts of titanium oxide were dry-mixed in a Henshel mixer (trademark, Mitui-miike Seisakusho). Next, the mixture was melt-kneaded in Co-keader PR-46 (manufactured by Bus in Swizerland) at 100° C. and then allowed to cool. The solid mass was pulverized in a hammer mill and shieved with a 150 mesh wire screen to obtain powder coatings (a-44).

REFERENCE EXAMPLE 45

PREPARATION OF ACRYLIC RESIN POWDER COATINGS (A-45)

100 parts of acrylic resin (a-41) obtained in Reference Example 41, 24 parts of decane dicarboxylic acid and 30 parts of titanium oxide were dry-mixed in a Henshel mixer (trademark, Mitui-miike Seisakusho). Next, the mixture was melt-kneaded in Co-keader PR-46 (manufactured by Bus in Swizerland) at 100° C. and then allowed to cool. The solid mass was pulverized in a hammer mill and shieved with a 150 mesh wire screen to obtain powder coatings (a-45).

REFERENCE EXAMPLE 46

PREPARATION OF EPOXY RESIN POWDER COATINGS (A-46)

100 parts of Epotohto YD-019 (epoxy resin, manufactured by Tohto Kasei K.K., trademark), 3 parts of dicyandiamide and 40 parts of titanium oxide were dry-mixed in a Henshel mixer (trademark, Mitui-miike Seisakusho). Next, the mixture was melt-kneaded in Co-keader PR-46 (manufactured by Bus in Swizerland) at 100° C. and then allowed to cool. The solid mass was pulverized in a hammer mill and shieved with a 150 mesh wire screen to obtain powder coatings (a-46).

EXAMPLE 19

UNCROSSLINKED RESIN MICROPARTICLES A-31, 1% ADDITION

To 99 parts of the powder coatings (a-43) obtained in Reference Example 43, 1 part of the uncrosslinked resin microparticles (a-31) obtained in Reference Example 31 was added and the combined was dry-mixed in Henshel mixer for 30 seconds to obtain powder coatings (A-19).

EXAMPLE 20

UNCROSSLINKED RESIN MICROPARTICLES A-32, 1.5% ADDITION

To 98.5 parts of the powder coatings (a-43) obtained in Reference Example 43, 1.5 parts of the uncrosslinked resin microparticles (a-32) obtained in Reference Example 32 were added and the combined was dry-mixed in Henshel mixer for 30 seconds to obtain powder coatings (A-20).

EXAMPLE 21

UNCROSSLINKED RESIN MICROPARTICLES A-33, 2% ADDITION

To 98 parts of the powder coatings (a-43) obtained in Reference Example 43, 2 parts of the uncrosslinked resin microparticles (a-33) obtained in Reference Example 33 were added and the combined was dry-mixed in Henshel mixer for 30 seconds to obtain powder coatings (A-21).

COMPARATIVE EXAMPLE 14

UNCROSSLINKED RESIN MICROPARTICLES 0% ADDITION

The powder coatings (a-43) obtained in Reference Example 43 were used as comparative powder coatings (CA-14).

EXAMPLE 22

UNCROSSLINKED RESIN MICROPARTICLES A-34, 1% ADDITION

To 99 parts of the powder coatings (a-44) obtained in Reference Example 44, 1 part of the uncrosslinked resin microparticles (a-34) obtained in Reference Example 34 was added and the combined was dry-mixed in Henshel mixer for 30 seconds to obtain powder coatings (A-22).

COMPARATIVE EXAMPLE 15

UNCROSSLINKED RESIN MICROPARTICLES A-35, 1% ADDITION

To 99 parts of the powder coatings (a-43) obtained in Reference Example 43, 1 part of the uncrosslinked resin microparticles (a-35) obtained in Reference Example 35 was added and the combined was dry-mixed in Henshel mixer for 30 seconds to obtain powder coatings (CA-15).

EXAMPLE 23

UNCROSSLINKED RESIN MICROPARTICLES A-31, 5% ADDITION

To 95 parts of the powder coatings (a-44) obtained in Reference Example 44, 5 parts of the uncrosslinked resin microparticles (a-31) obtained in Reference Example 31 were added and the combined was dry-mixed in Henshel mixer for 30 seconds to obtain powder coatings (A-23).

COMPARATIVE EXAMPLE 16

UNCROSSLINKED RESIN MICROPARTICLES A-31, 0.01% ADDITION

To 99.99 parts of the powder coatings (a-43) obtained in Reference Example 43, 0.01 part of the uncrosslinked resin microparticles (a-31) obtained in Reference Example 31 was added and the combined was dry-mixed in Henshel mixer for 30 seconds to obtain powder coatings (CA-16).

COMPARATIVE EXAMPLE 17

UNCROSSLINKED RESIN MICROPARTICLES A-31, 35% ADDITION

To 65 parts of the powder coatings (a-43) obtained in Reference Example 43, 35 parts of the uncrosslinked resin microparticles (a-31) obtained in Reference Example 31 wereadded and the combined was dry-mixed in Henshel mixer for 30 seconds to obtain powder coatings (CA-17).

EXAMPLE 24

CROSSLINKED RESIN MICROPARTICLES A-36, 2% ADDITION

To 98 parts of the powder coatings (a-43) obtained in Reference Example 43, 2 parts of the crosslinked resin microparticles (a-36) obtained in Reference Example 36 were added and the combined was dry-mixed in Henshel mixer for 30 seconds to obtain powder coatings (A-24).

EXAMPLE 25

CROSSLINKED RESIN MICROPARTICLES A-36, 0.5% ADDITION

To 99.5 parts of the powder coatings (a 43) obtained in Reference Example 43, 0.5 part of the crosslinked resin microparticles (a-36) obtained in Reference Example 36 was added and the combined was dry-mixed in Henshel mixer for 30 seconds to obtain powder coatings (A-25).

EXAMPLE 26

UNCROSSLINKED RESIN MICROPARTICLES A-38, 1% ADDITION

To 99 parts of the powder coatings (a-43) obtained in Reference Example 43, 1 part of the uncrosslinked resin microparticles (a-38) obtained in Reference Example 38 was added and the combined was dry-mixed in Henshel mixer for 30 seconds to obtain powder coatings (A-26).

EXAMPLE 27

UNCROSSLINKED RESIN MICROPARTICLES A-39, 1.5% ADDITION

To 98.5 parts of the powder coatings (a-43) obtained in Reference Example 43, 1.5 parts of the uncrosslinked resin microparticles (a-39) obtained in Reference Example 39 were added and the combined was dry-mixed in Henshel mixer for 30 seconds to obtain powder coatings (A-27).

EXAMPLE 28

UNCROSSLINKED RESIN MICROPARTICLES A-31,1% ADDITION /ACRYLIC POWDER

To 99 parts of the powder coatings (a-45) obtained in Reference Example 45, 1 part of the uncrosslinked resin microparticles (a-31) obtained in Reference Example 31 was added and the combined was dry-mixed in Henshel mixer for 30 seconds to obtain powder coatings (A-28).

COMPARATIVE EXAMPLE 18

The acrylic resin powder (a-45) obtained in Reference Example 45 was used as comparative powder coating (CA-18).

EXAMPLE 29

UNCROSSLINKED RESIN MICROPARTICLES A-31,1% ADDITION /EPOXY POWDER

To 99 parts of the powder coatings (a-46) obtained in Reference Example 46, 1 part of the uncrosslinked resin microparticles (a-31) obtained in Reference Example 31 was added and the combined was dry-mixed in Henshel mixer for 30 seconds to obtain powder coatings (A-29).

EXAMPLE 30

UNCROSSLINKED RESIN MICROPARTICLES A-42, 2% ADDITION

To 98 parts of the powder coatings (a-43) obtained in Reference Example 43, 2 parts of the uncrosslinked resin microparticles (a-42) obtained in Reference Example 42 were added and the combined was dry-mixed in Henshel mixer for 30 seconds to obtain powder coatings (A-30).

COMPARATIVE EXAMPLE 19

The epoxy resin powder (a-46) obtained in Reference Example 46 was used as comparative powder coating (CA-19).

COMPARATIVE EXAMPLE 20

UNCROSSLINKED RESIN MICROPARTICLES A-40, 2% ADDITION

To 98 parts of the powder coatings (a-43) obtained in Reference Example 43, 2 parts of the uncrosslinked resin microparticles (a-40) obtained in Reference Example 40 were added and the combined was dry-mixed in Henshel mixer for 30 seconds to obtain powder coatings (CA-20).

The respective powder coatings A-19 to A-30 and CA-14 to CA-20 were evaluated as previously mentioned and test results were shown in Table 3.

REFERENCE EXAMPLE 47

Into a reaction flask fitted with a stirrer, a condenser and a thermoregulator, were placed 380 parts of deionized water and 2 parts of nonionic surfactant MON2

(trademark, Sanyo Kasei K.K.) and the mixture was stirred at 80° C. to get a clear solution. To this, a solution of 1 part of ammonium persulfate (initiator) in 10 parts of deionized water was added and then a mixture of 85 parts of methyl methacrylate, 5 parts of styrene, 10 parts of n-butyl methacrylate and 10 parts of dimethylaminomethyl methacrylate was dropwise added in 1 hour. After completion of said addition, the combined was stirred at 80° C. for additional 1 hour to obtain an emulsion having an average emulsion diameter of 0.03 to 0.05 $\mu$. This was then subjected to a spray-drying to obtain resin microparticles bearing catalytic function having a Tg value of 100° C. and Sp value of 10.7. (a 47)

REFERENCE EXAMPLE 48

Into a reaction flask fitted with a stirrer, a condenser and a thermoregulator, were placed 380 parts of deionized water and 2 parts of nonionic surfactant MON2 (trademark, Sanyo Kasei K.K.) and the mixture was stirred at 80° C. to get a clear solution. To this, a solution of 1 part of ammonium persulfate (initiator) in 10 parts of deionized water was added and then a mixture of 19 parts of 2-hydroxyethyl methacrylate, 20 parts of styrene, 61 parts of n-butyl methacrylate and 10 parts of dimethylaminomethyl methacrylate was dropwise added in 1 hour. After completion of said addition, the combined was stirred at 80° C. for additional 1 hour to obtain an emulsion having an average emulsion diameter of 0.03 to 0.05 $\mu$. This was then subjected to a spray drying to obtain resin microparticles bearing catalytic function having a Tg value of 40° C. and Sp value of 10.0.(a-48)

REFERENCE EXAMPLE 49

Into a reaction flask fitted with a stirrer, a condenser and a thermoregulator, were placed 282 parts of deionized water and 2 parts of nonionic surfactant MON2 (trademark, Sanyo Kasei K.K.) and dimethylethanolamine and the mixture was stirred at 80° C. to get a clear solution. To this, a solution of 4.5 parts of azobiscyanovaleric acid (initiator) in 45 parts of deionized water and 4.3 parts of dimethyl ethanol amine was added and then a mixture of 70.7 parts of styrene, 94.2 parts of n butyl acrylate, 70.7 parts of methyl methacrylate, 30 parts of 2-hydroxyethyl acrylate and 4.5 parts of ethyleneglycol dimethacrylate was dropwise added in 1 hour. Thereafter, a solution of 1.5 parts of azobiscyanovaleric acid in 15 parts of deionized water and 1.4 parts of dimethylethanol amine was added and the combined was stirred at 80° C. for additional 1 hour to obtain an emulsion having an average emulsion diameter of 0.16 $\mu$. This was then subjected to a spray-drying to obtain resin microparticles bearing catalytic function having a Tg value of 85° C. and Sp value of 10.18. (a-49)

REFERENCE EXAMPLE 50

PREPARATION CATALYST IMPREGNATED RESIN MICROPARTICLES (A-50)

Into a reaction flask fitted with a dropping funnel, a stirrer and a thermometer, were placed 80 parts of xylene and heated to 130° C. To this, a mixture of 55 parts of methyl methacrylate, 10 parts of styrene, 30 parts of glycidyl methacrylate, 5 parts of n-butyl methacrylate and 6 parts of initiator Kayaester-O was dropwise added from the dropping funnel in 3 hours. After maintaining the same temperature for 30 minutes, a solution of 1 part of Kayaester-O in 20 parts of xylene was dropwsie added in 1 hour and the combined was maintained at 130° C. for 2 hours. Xylene was distilled off under reduced pressure and thus obtained acrylic resin was pulverized to obtain resin microparticles having an average diameter of 0.5 $\mu$, SP=1.3, Tg=70° C. Thus obtained microparticles were mixed well while spraying 10 parts of dimethylethanolamine thereupon to obtain the catalyst impregnated resin microparticles (a-50).

REFERENCE EXAMPLE 51

PREPARATION OF RESIN MICROPARTICLES KNEADED WITH A CATALYST (A-51)

Into a reaction flask fitted with a dropping funnel, a stirrer and a thermometer, were placed 80 parts of xylene and heated to 130° C. To this, a mixture of 55 parts of methyl methacrylate, 10 parts of styrene, 30 parts of glycidyl methacrylate, 5 parts of n-butyl methacrylate and 6 parts of initiator Kayaester-0 was dropwise added from the dropping funnel in 3 hours. After maintaining the same temperature for 30 minutes, a solution of 1 part of Kayaester-O in 20 parts of xylene was dropwise added and the combined was maintained at 130° C. for 30 minutes. Thereafter, xylene was distilled off under reduced pressure to obtain acrylic resin powder. Using a co-kneader, said acrylic resin powder and 3 parts of catalyst C 17 Z (manufactured by Shikoku Kasei) were melt-dispersed and pulverized to obtain resin microparticles (a-51) having a Tg value of 70° C. and SP value of 10.3.

REFERENCE EXAMPLE 52

PREPARATION OF RESIN MICROPARTICLES KNEADED WITH A CATALYST (A-52)

Into a reaction flask fitted with a dropping funnel, a stirrer and a thermometer, were placed 80 parts of xylene and heated to 130° C. To this, a mixture of 55 parts of methyl methacrylate, 10 parts of styrene, 30 parts of glycidyl methacrylate, 5 parts of n-butyl methacrylate and 6 parts of initiator Kayaester-O was dropwise added from the dropping funnel in 3 hours. After maintaining the same temperature for 30 minutes, a solution of 1 part of Kayaester-O in 20 parts of xylene was dropwise added and the combined was maintained at 130° C. for 30 minutes. Thereafter, xylene was distilled off under reduced pressure to obtain acrylic resin powder. Using a co-kneader, said acrylic resin powder and DWEA were melt-dispersed and pulverized to obtain resin microparticles (a-52) having a Tg value of 70° C. and SP value of 10.3.

REFERENCE EXAMPLE 53

PREPARATION OF ACRYLIC RESIN POWDER COATINGS (A-53)

Into a reaction flask fitted with a dropping funnel, a stirrer and a thermometer, were placed 80 parts of xylene and heated to 130° C. To this, a mixture of 55 parts of methyl methacrylate, 10 parts of styrene, 30 parts of glycidyl methacrylate, 5 parts of n-butyl methacrylate and 6 parts of initiator Kayaester-O was dropwise added from the dropping funnel in 3 hours and the mixture was maintained at the same temeprature for 30 minutes. Thereafter, a solution of 1 part of Kayaester-O in 20 parts of xylene was dropwise added in 1 hour and the combined was maintained at 130° C. for 2 hours. Xylene was distilled off under reduced pressure to obtain an acrylic resin having a Tg value of 70° C. 100 parts of thus obtained acrylic resin, 24 parts of decane dicarboxylic acid and 30 parts of titanium oxide were dry-mixed in Henshel mixer (manufactured by Mitui Mike Seisakusho) and the mixture was melt-dispersed in co-kneader at 100° C. After cooling, the resulted mass was pulverized by means of hammer mill and shieved through 150 mesh wire screen to obtain acrylic resin powder coatings (a-53).

REFERENCE EXAMAPLE 54

PREPARATION OF EPOXY RESIN POWDER COATINGS (A-54)

100 parts of Epotohto YD-019 (trademark, epoxy resin, manufactured by Tohto Kase K.K.), 3 parts of dicyandiamide and 40 parts of titanium oxide were dry-mixed in Henshel mixer and then subjected to melt-dispersion in co-kneader at 100° C. After cooling, the resulted mass was pulverized by means of hammer mill and shieved through 150 mesh screen to obtain epoxy resin powder (a-54).

REFERENCE EXAMPLE 55

PREPARATION OF POLYESTER RESIN POWDER COATINGS (A-55)

100 parts of ER6800 (trademark, polyester resin, manufactured by Nihon Polyester K.K.), 36 parts of Krelan UI (trademark, blocked isocyanate, BASF) and 40 parts of titanium oxide were dry-mixed in Henshel mixer and then subjected to melt-dispersion in co-kneader at 100° C. After cooling, the resulted mass was pulverized by means of hammer mill and shieved through 150 mesh screen to obtain polyester resin powder (a-55).

REFERENCE EXAMPLE 56

PREPARATION OF ACRYLIC RESIN POWDER COATINGS CONTAINING MATTING AGENT (A-56)

Into a reaction flask fitted with a dropping funnel, a stirrer and a thermometer, were placed 80 parts of xylene and heated to 130° C. To this, a mixture of 55 parts of methyl methacrylate, 10 parts of styrene, 30 parts of glycidyl methacrylate, 5 parts of n-butyl methacrylate and 6 parts of Kayaester-O was dropwsie added from the dropping funnel in 3 hours and after maintaining at the same temperature for 30 minutes, a solution of 1 part of Kayaester-O in 20 parts of xylene was dropwise added and the combined was maintained at 130° C. for 2 hours. Thereafter, xylene was distilled off in vaccuo to obtain an acrylic resin having a Tg value of 70° C. 100 parts of thus obtained acrylic resin, 24 parts of decane dicarboxylic acid, 30 parts of titanium oxide and 25 parts of Crystalight (trademark, matting agent, manufactured by Tatsumori K.K.) were dry-mixed in Henshel mixer and then subjected to a melt-dispersion in co-kneader at 100° C. After cooling, the remained mass was pulverized by hammer mill and shieved through 150 mesh wire screen to obtain powder coatings (a-56).

REFERENCE EXAMPLE 57

PREPARATION OF EPOXY RESIN POWDER COATINGS CONTAINING PLURAL NUMBER OF HARDENING AGENTS (A-56)

50 parts of Epotohto NT-114 (trademark, epoxy resin, manufactured by Tohto Kasei K.K.), 20 parts of M8520(trademark, carboxyl group containing resin, DIC ), 40 parts of titanium oxide and 3 parts of Hardener B-68 (Sakai Shoji K.K.) were dry-mixed in Henshel mixer and then subjected to a melt-dispersion in co-kneader at 100° C. After cooling, the resulted mass was pulverized by means of hammer mill and shieved through 150 mesh wire screen to obtain epoxy resin powder coatings (a-57).

REFERENCE EXAMPLE 58

PREPARATION OF POLYESTER RESIN POWDER COATINGS KNEADED WITH CATALYST.(A-58)

100 parts of ER6800 (trademark, polyester resin, manufactured by Nihon Polyester K.K.), 36 parts of Krelan UI (trademark, blocked isocyanate, BASF), 40 parts of titanium oxide and 2 parts of catalyst DBTO were dry-mixed in Henshel mixer and then subjected to a melt-dispersion in co-kneader at 100° C. After cooling, the resulted mass was pulverized by means of hammer mill and shieved through 150 mesh wire screen to obtain polyester resin powder coatings (a-58).

EXAMPLE 31

99.5 parts of powder(a-53) obtained in Reference Example 53 , 0.5 part of resin microparticles (a-47) obtained in Reference Example 47 was added and dry-mixed in Henshel mixer for 120 seconds to obtain the present powder coatings (A-31).

EXAMPLES 32 TO 40 AND COMPARATIVE EXAMPLES 21 TO 29

Using the materials shown in Table 4 and following the procedured of Example 31, various powder coatings (A-32) to (A-40) and (CA-21) to (CA-29) were prepared. These powder coatings were tested and evaluated as previously mentioned and test results were shown in Table 4.

TABLE 1

| Example | | | | 1 | 2 | 3 | 4 | 5 | 6 | 7 | 8 | 9 |
|---|---|---|---|---|---|---|---|---|---|---|---|---|
| Powder coatings mother powder | | | | A-1 | A-2 | A-3 | A-4 | A-5 | A-6 | A-7 | A-8 | A-9 |
| a-12 | | | | 99 | 99 | 99.5 | 95 | 98.5 | 98.5 | | | 99 |
| a-13 | | | | | | | | | | | | |
| a-14 | | | | | | | | | | 95 | | |
| a-15 | | | | | | | | | | | 99 | |
| microparticles | | | | | | | | | | | | |
| type | Tg | SP | diam. | | | | | | | | | |
| a-1 | 110 | 10 | 0.03–0.05 | 1 | | | 5 | | | 5 | 1 | 1 |
| a-4 | 100 | 10.5 | 0.03–0.05 | | 1 | | | | | | | |
| a-5 | 90 | 11 | 0.5 | | | 0.5 | | | | | | |
| a-7 | 85 | 10.2 | 0.16 | | | | | 1.5 | | | | |
| a-8 | 85 | 10.2 | 0.15–0.3 | | | | | | 1.5 | | | |
| Evaluation | | | | | | | | | | | | |

TABLE 1-continued

| | | | | | | | | | |
|---|---|---|---|---|---|---|---|---|---|
| blocking resistance | O | O | O | O | O | O | O | O | O |
| appearance 60° gloss | O | O | O | O | O | O | O | O | O |
| stain resistance magic ink | O | O | O | O | O | O | O | O | O |
| stain resistance tobacco smoke | O | O | O | O | O | O | O | O | O |

| Comparative Example | | | 1 | 2 | 3 | 4 | 5 | 6 | 7 |
|---|---|---|---|---|---|---|---|---|---|
| Powder coatings | | | CA-1 | CA-2 | CA-3 | CA-4 | CA-5 | CA-6 | CA-7 |
| mother powder | | | | | | | | | |
| a-12 | | | 99 | 99.5 | 99.99 | 70 | | | 100 |
| a-13 | | | | | | | | | |
| a-14 | | | | | | | 100 | | |
| a-15 | | | | | | | | 100 | |
| microparticles | | | | | | | | | |
| type | Tg | SP | diam. | | | | | | |
| a-1 | 110 | 10 | 0.03–0.05 | | | 0.01 | 50 | | |
| a-3 | 90 | 8.5 | 0.03–0.05 | 1 | | | | | |
| a-5 | 90 | 11 | 0.5 | | | | | | |
| a-6 | 90 | 11 | 15 | | 0.5 | | | | |
| a-8 | 85 | 10.2 | 0.15–0.3 | | | | | | |
| Evaluation | | | | | | | | | |
| blocking resistance | | | O | O | Δ | O | X | Δ | Δ |
| appearance 60° gloss | | | O | X | O | X | O | O | O |
| stain resistance magic ink | | | Δ | Δ | Δ | O | X | X | X |
| stain resistance tobacco smoke | | | X | X | Δ | O | X | X | X |

TABLE 2

| Example | | | | 10 | 11 | 12 | 13 | 14 | 15 | 16 | 17 | 18 |
|---|---|---|---|---|---|---|---|---|---|---|---|---|
| Powder coatings | | | | A-10 | A-11 | A-12 | A-13 | A-14 | A-15 | A-16 | A-17 | A-18 |
| mother powder | | | | | | | | | | | | |
| a-27 | | | | 99 | 99 | 80 | | | 99 | 99 | | 80 |
| a-28 | | | | | | | 99 | | | | | |
| a-29 | | | | | | | | 99 | | | | |
| a-30 | | | | | | | | | | | 95 | |
| microparticles | | | | | | | | | | | | |
| type | Tg | SP | diam. | | | | | | | | | |
| a-17 | 100 | 10.5 | 0.03–0.05 | 1 | | | 1 | 1 | | | 5 | |
| a-18 | 100 | 10.5 | 0.3 | | 1 | 20 | | | | | | |
| a-21 | 90 | 9.95 | 0.5 | | | | | | 1 | | | |
| a-22 | 50 | 10.1 | 0.5 | | | | | | | 1 | | |
| a-23 | 85 | 10.18 | 0.16 | | | | | | | | | 20 |
| Evaluation | | | | | | | | | | | | |
| blocking resistance | | | | O | O | O | O | O | O | O | O | O |
| appearance 60° gloss | | | | O | O | O | O | O | O | O | O | Δ |
| stain resistance magic ink | | | | O | O | O | O | O | O | Δ | O | Δ |

| Comparative Example | | | | 8 | 9 | 10 | 11 | 12 | 13 |
|---|---|---|---|---|---|---|---|---|---|
| Powder coatings | | | | CA-8 | CA-9 | CA-10 | CA-11 | CA-12 | CA-13 |
| mother powder | | | | | | | | | |
| a-27 | | | | 99 | 99 | 99.99 | 60 | 100 | |
| a-28 | | | | | | | | | |
| a-29 | | | | | | | | | |
| a-30 | | | | | | | | | 100 |
| microparticles | | | | | | | | | |
| type | Tg | SP | diam. | | | | | | |
| a-16 | 40 | 10 | 0.03–0.05 | 1 | | | | | |
| a-19 | 110 | 10 | 0.03–0.05 | | | 0.01 | 40 | | |
| a-20 | 90 | 9.95 | 15 | | 1 | | | | |
| Evaluation | | | | | | | | | |
| blocking resistance | | | | X | Δ–X | Δ–X | O | X | X |
| appearance 60° gloss | | | | O | X | O | X | O | O |
| stain resistance magic ink | | | | X | O | O | O | Δ | X |

TABLE 3

| Example | | | | 19 | 20 | 21 | 22 | 23 | 24 |
|---|---|---|---|---|---|---|---|---|---|
| Powder coatings | | | | A-19 | A-20 | A-21 | A-22 | A-23 | A-24 |
| mother powder | | | | | | | | | |
| a-43 | | | | 99 | 98.5 | 98 | | | 98 |
| a-44 | | | | | | | 99 | 95 | |
| a-45 | | | | | | | | | |
| a-46 | | | | | | | | | |
| microparticles | | | | | | | | | |
| type | Tg | SP | diam. | | | | | | |
| a-31 | 110 | 10.6 | 0.03–0.05 | 1 | | | | 5 | |
| a-32 | 90 | 11 | 0.03–0.05 | | 1.5 | | | | |

TABLE 3-continued

| | | | | | | | | | |
|---|---|---|---|---|---|---|---|---|---|
| a-33 | 100 | 10.5 | 0.03–0.05 | | | | 2 | | |
| a-34 | 70 | 10.3 | 0.5 | | | | | 1 | |
| a-36 | 85 | 10.18 | 0.16 | | | | | | 2 |
| Evaluation | | | | | | | | | |
| weather resistance | | | | O | O | O | O | O | O |
| blocking resistance | | | | O | O | O | O | O | O |
| appearance 60° gloss | | | | O | O | O | O | O | O |
| stain resistance  magic ink | | | | O | O | O | Δ | O | Δ |

| Example | 25 | 26 | 27 | 28 | 29 | 30 |
|---|---|---|---|---|---|---|
| Powder coatings | A-25 | A-26 | A-27 | A-28 | A-29 | A-30 |
| mother powder | | | | | | |
| a-43 | 99.5 | 99 | 98.5 | | | 98 |
| a-44 | | | | | | |
| a-45 | | | | 99 | | |
| a-46 | | | | | 99 | |
| microparticles | | | | | | |
| type   Tg  SP   diam. | | | | | | |
| a-31  110  10.6  0.03–0.05 | | | | 1 | 1 | |
| a-36   85  10.18  0.16 | 0.5 | | | | | |
| a-38   80  10.0  0.12 | | 1 | | | | |
| a-39   69  11.6  4.5 | | | 1.5 | | | |
| a-42   70  10.2  0.5 | | | | | | 2 |
| Evaluation | | | | | | |
| weather resistance | O | O | O | O | O | O |
| blocking resistance | O | O | O | O | O | O |
| appearance 60° gloss | O | O | O | O | O | O |
| stain resistance  magic ink | Δ | Δ | Δ | O | O | Δ |

| Comparative Example | 14 | 15 | 16 | 17 | 18 | 19 | 20 |
|---|---|---|---|---|---|---|---|
| Powder coatings | CA-14 | CA-15 | CA-16 | CA-17 | CA-18 | CA-19 | CA-20 |
| mother powder | | | | | | | |
| a-43 | 100 | 99 | 99.99 | 65 | | | 98 |
| a-44 | | | | | | | |
| a-45 | | | | | 100 | | |
| a-46 | | | | | | 100 | |
| microparticles | | | | | | | |
| type   Tg  SP   diam. | | | | | | | |
| a-31  110  10.6  0.03–0.05 | | | 0.01 | 35 | | | |
| a-35   70  10.3  15 | | 1 | | | | | |
| a-40   40  9.8  0.5 | | | | | | | 2 |
| Evaluation | | | | | | | |
| weather resistance | X | Δ | Δ | Δ | X | X | O |
| appearance 60° gloss | O | Δ | O | X | O | O | O |
| blocking resistance | X | Δ | Δ | O | X | X | X |
| stain resistance  magic ink | X | Δ | O | O | Δ | X | X |

(Evaluation of weather resistance: O ... excellent; Δ ... certain reduction in gloss; X ... bad, no gloss)

TABLE 4

| Example | 31 | 32 | 33 | 34 | 35 | 36 | 37 | 38 | 39 | 40 |
|---|---|---|---|---|---|---|---|---|---|---|
| Powder coatings | A-31 | A-32 | A-33 | A-34 | A-35 | A-36 | A-37 | A-38 | A-39 | A-40 |
| mother powder | | | | | | | | | | |
| a-53 | 99.5 | 99 | 95 | | 85 | 70 | 99 | 95 | 99 | |
| a-54 | | | | 95 | | | | | | 99 |
| a-55 | | | | | | | | | | |
| microparticles | | | | | | | | | | |
| type   Tg  SP   diam. | | | | | | | | | | |
| a-47  100  10.7  0.03–0.05 | 0.5 | 1 | 5 | 5 | 15 | 30 | | | | 1 |
| a-49   85  10.18  0.16 | | | | | | | 1 | | | |
| a-50   70  10.3  0.5 | | | | | | | | 5 | | |
| a-51   70  10.3  0.5 | | | | | | | | | 1 | |
| Evaluation | | | | | | | | | | |
| appearance | O | O | O | O | O | O | O | O | O | O |
| blocking resistance | O | O | O | O | O | O | O | O | O | O |
| 60° gloss | 40 | 10 | 5 | 8 | 4 | 3 | 7 | 30 | 25 | 15 |
| stain resistance  magic ink | O | O | O | O | O | O | Δ | Δ | Δ | O |

| Comparative Example | 21 | 22 | 23 | 24 | 25 | 26 | 27 | 28 | 29 |
|---|---|---|---|---|---|---|---|---|---|
| Powder coatings | CA-21 | CA-22 | CA-23 | CA-24 | CA-25 | CA-26 | CA-27 | CA-28 | CA-29 |
| mother powder | | | | | | | | | |
| a-53 | 99.99 | 98 | 98 | | | 100 | | | |
| a-54 | | | | | 100 | | | | |
| a-55 | | | | 100 | | | | | |
| a-56 | | | | | | | 100 | | |
| a-57 | | | | | | | | 100 | |
| a-58 | | | | | | | | | 100 |

TABLE 4-continued

| microparticles | | | | | | | | | | | | |
|---|---|---|---|---|---|---|---|---|---|---|---|---|
| type | Tg | SP | diam. | | | | | | | | | |
| a-47 | 100 | 10.7 | 0.03–0.05 | 0.01 | | | | | | | | |
| a-48 | 40 | 10.0 | 0.03–0.05 | | | 2 | | | | | | |
| a-52 | 70 | 10.3 | 15 | | 2 | | | | | | | |
| Evaluation | | | | | | | | | | | | |
| blocking resistance | | | | O | Δ | X | O | O | O | O | O | O |
| appearance | | | | O | X | O | O | O | O | Δ | O | O |
| 60° gloss | | | | 75 | 55 | 8 | 70 | 88 | 91 | 60 | 55 | 87 |
| stain resistance | | magic ink | | O | Δ | X | X | X | X | Δ | Δ | Δ |

What is claimed is:

1. Powder coatings comprising thermoplastic or thermosetting resin powder particles, each particle carrying, at least on the surface thereof, a number of microparticles having an average diameter of 0.001 to 10μ of such resin as having a glass transition temperature of 50 to 150° C. and a SP value of 9 to 15, the weight ratio of said microparticles to the total weight of the powder coatings being 0.05 to 30% by weight.

2. Powder coatings according to claim 1 wherein said glass transition temperature of microparticle resin is 80 to 150° C.

3. Powder coatings according to claim 1 wherein said microparticles are composed of uncrosslinked resin.

4. Powder coatings according to claim 1 or 2 wherein said microparticles each contains UV absorber or antioxidant.

5. Powder coatings according to claim 1 wherein the powder particles are thermosetting and the resin for said microparticle bears a hardening catalytic function through adsorption or absorption of a hardening catalyst to the resin or integral incorporation of a catalytically functioning group in a constituting monomer of said resin.

* * * * *